US010980084B2

(12) United States Patent
Dao et al.

(10) Patent No.: US 10,980,084 B2
(45) Date of Patent: Apr. 13, 2021

(54) SUPPORTING MULTIPLE QOS FLOWS FOR UNSTRUCTURED PDU SESSIONS IN WIRELESS SYSTEM USING NON-STANDARDIZED APPLICATION INFORMATION

(71) Applicants: Ngoc Dung Dao, Ottawa (CA); Xu Li, Nepean (CA)

(72) Inventors: Ngoc Dung Dao, Ottawa (CA); Xu Li, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 129 days.

(21) Appl. No.: 16/273,347

(22) Filed: Feb. 12, 2019

(65) Prior Publication Data
US 2019/0254118 A1 Aug. 15, 2019

Related U.S. Application Data

(60) Provisional application No. 62/631,382, filed on Feb. 15, 2018.

(51) Int. Cl.
*H04L 29/08* (2006.01)
*H04W 12/088* (2021.01)
(Continued)

(52) U.S. Cl.
CPC ......... *H04W 80/10* (2013.01); *H04L 12/1407* (2013.01); *H04L 63/0263* (2013.01);
(Continued)

(58) Field of Classification Search
None
See application file for complete search history.

(56) References Cited

U.S. PATENT DOCUMENTS

2014/0194111 A1* 7/2014 Aso .................. H04W 52/0264
455/419
2018/0035360 A1* 2/2018 Rasanen ............... H04W 48/14
(Continued)

FOREIGN PATENT DOCUMENTS

CN 107018542 A 8/2017
WO 2017219973 A1 12/2017

OTHER PUBLICATIONS

"System Architecture for the 5G System; Stage 2"; 3GPP TS 23.501 V2.0.1 (Dec. 2017).
(Continued)

*Primary Examiner* — Ajit Patel

(57) ABSTRACT

A method in a session management function (SMF) of a network. The method comprises: receiving a session request message from a user equipment (UE), the session request message comprising: an identifier of the UE; a UE-specific application identifier that uniquely identifies a particular application among a set of one or more applications implemented on the UE; and an application-specific packet filter set identifier that uniquely identifies a particular packet filter set among a group of one or more packet filter sets supported by the particular application. A protocol data unit (PDU) session is established based at least in part on the identifier of the UE, the UE-specific application identifier, and the application-specific packet filter set identifier.

20 Claims, 10 Drawing Sheets

(51) Int. Cl.
H04W 80/10 (2009.01)
H04L 12/14 (2006.01)
H04W 76/12 (2018.01)
H04W 60/00 (2009.01)
H04L 29/06 (2006.01)
H04W 28/02 (2009.01)
H04W 12/06 (2021.01)
H04W 48/18 (2009.01)

(52) U.S. Cl.
CPC ....... *H04W 12/06* (2013.01); *H04W 28/0268* (2013.01); *H04W 48/18* (2013.01); *H04W 60/00* (2013.01); *H04W 76/12* (2018.02)

(56) References Cited

U.S. PATENT DOCUMENTS

| | | | | |
|---|---|---|---|---|
| 2018/0376384 | A1* | 12/2018 | Youn | H04W 8/02 |
| 2019/0150219 | A1* | 5/2019 | Wang | H04W 76/30 |
| | | | | 370/329 |
| 2019/0174573 | A1* | 6/2019 | Velev | H04W 76/12 |
| 2019/0182386 | A1* | 6/2019 | Sharma | H04L 12/141 |
| 2019/0182737 | A1* | 6/2019 | Futaki | H04W 36/36 |
| 2019/0191309 | A1* | 6/2019 | Kweon | H04W 80/10 |
| 2019/0357287 | A1* | 11/2019 | Kawasaki | H04W 64/00 |
| 2019/0364420 | A1* | 11/2019 | Rommer | H04L 63/0485 |
| 2019/0387428 | A1* | 12/2019 | Ahmad | H04L 69/08 |
| 2020/0178048 | A1* | 6/2020 | Kim | H04W 8/005 |

OTHER PUBLICATIONS

"Procedures for the 5G System; Stage 2"; 3GPP TS 23.502 V2.0.0 (Dec. 2017).

Nokia et al., 23.501 § 5.6.7: Application Function influence on traffic routing (location information and corrections). SA WG2 Meeting #120 Mar. 27-31, 2017, Busan, South Korea, S2-172609, 8 pages.

Ericsson et al., 23.501: Cleanup of QoS framework description. SA WG2 Meeting #120 Mar. 27-31, 2017, Busan, Korea, S2-172839, 10 pages.

Nokia et al., 23.502: Correcting information flows in § 4.3 (PDU session related. SA WG2 Meeting #124 Nov. 27-Dec. 1, 2017, Reno, NV, USA, S2-178255, 34 pages.

* cited by examiner

SUPPORTING MULTIPLE QOS FLOWS FOR UNSTRUCTURED PDU SESSIONS IN WIRELESS SYSTEM USING NON-STANDARDIZED APPLICATION INFORMATION

CROSS REFERENCE TO RELATED APPLICATIONS

This application claims the benefit of priority to U.S. Provisional Application Ser. No. 62/631,382 filed Feb. 15, 2018, the contents of which are hereby incorporated by reference.

FIELD OF THE INVENTION

The present invention pertains to the field of communications networks, and in particular to supporting multiple flows within unstructured PDU (Protocol Data Unit) sessions using non-standardized application information.

BACKGROUND

The networks complying with the Third Generation Partnership Project (3GPP) 5G standards (e.g. Release 15 and beyond) are expected to provide extensive support for IPv4, IPv6 and Ethernet packet flows within at least one of the core network and the radio access network. A wide variety of other PDU formats can be supported by such networks by making use of a so-called "unstructured" PDU session, in which traffic forwarding is handled with little or no reference to the content of the packet header. A limitation of this approach is that a given unstructured PDU session can support only one QoS flow, since only one QoS level can be applied to the traffic within that unstructured PDU session. If the unstructured PDU session is used to support a plurality of different sessions (each using the same or a different PDU format), each of these different sessions will be treated with the same QoS.

It would be desirable to support more than one QoS flow within a single unstructured PDU Session.

This background information is intended to provide information that may be of possible relevance to the present invention. No admission is necessarily intended, nor should be construed, that any of the preceding information constitutes prior art against the present invention.

SUMMARY

An object of embodiments of the present invention is to provide techniques for supporting multiple QoS flows in a PDU session, for example an unstructured PDU Session.

An aspect of the present invention provides a method in a Session Management Function (SMF) of a network. The method comprises: receiving a session request message from a User Equipment (UE), the session request message comprising: an identifier of the UE; a UE-specific Application Identifier that uniquely identifies a particular application among a set of one or more Applications implemented on the UE; and an Application-Specific Packet Filter Set Identifier that uniquely identifies a particular Packet Filter set among a group of one or more Packet Filter sets supported by the particular application. A protocol data unit (PDU) session is established based at least in part on the identifier of the UE, the UE-specific Application Identifier, and the Application-Specific Packet Filter Set Identifier.

In one aspect of the present invention, the one or more of the UE-specific application identifier and the application-specific packet filter set identifier may be carried in the message. In another variation, the one or more of the UE-specific application identifier and the application-specific packet filter set identifier may be pre-defined in the SMF or a user data repository (UDR). In yet another variation, the one or more of the UE-specific application identifier and the application-specific packet filter set identifier may be provided by a Data Network Name (DNN) of a Data Network (DN) that hosts the set of one or more Applications supported by the UE.

In a further aspect, the obtaining, by the SMF, comprises obtaining the application-specific packet filter set identifier based on the identifier of the UE and the UE-specific application identifier.

In another aspect, the application-specific packet filter set identifier may be obtained based on a mapping between the application-specific packet filter set identifier and a combination including the identifier of the UE and the UE-specific application identifier.

In yet another aspect, establishing or modifying the PDU session comprises identifying the application based on a combination of the identifier of the UE and the UE-specific application identifier. In another variation, establishing or modifying the PDU session comprises identifying the packet filter set based on a combination of the identifier of the UE, the UE-specific application identifier, and the application-specific packet filter Set Identifier. In yet another variation, establishing or modifying the PDU session comprises identifying a Quality of Service (QoS) flow for the PDU session set based on a combination of the identifier of the UE, the UE-specific application identifier, and the application-specific packet filter set identifier.

In one aspect of the present invention, the PDU session may be an unstructured PDU session.

A further broad aspect of the present invention provides a method in a User Equipment (UE) of a network, The method comprises: transmitting a session request message to a Session Management Function (SMF) of the network, the session request message comprising: an identifier of the UE; a UE-specific Application Identifier that uniquely identifies a particular application among a set of one or more Applications implemented on the UE; and an Application-Specific Packet Filter Set Identifier that uniquely identifies a particular Packet Filter set among a group of one or more Packet Filter sets supported by the particular application.

In a further broad aspect, a method in a user equipment (UE) of a network comprises requesting an establishment or a modification of a PDU session with a session management function (SMF), a message carrying the request including: an identifier of the UE; and at least one of: a UE-specific application identifier that uniquely identifies an application among a set of one or more applications implemented on the UE, and an application-specific packet filter set identifier that uniquely identifies a packet filter set among a group of one or more packet filter sets supported by the application.

In one aspect, the one or more of the UE-specific application identifier and the application-specific packet filter set identifier is pre-defined in one of the SMF and a user data repository (UDR).

In another aspect, the application-specific packet filter set identifier is based on a mapping between the application-specific packet filter set identifier and a combination including the identifier of the UE and the UE-specific application identifier.

In another variation, the establishment or modification of the PDU session comprises identifying the application in accordance with a combination of the identifier of the UE and the UE-specific application identifier.

In a further aspect, the establishment or modification of the PDU session comprises identifying the packet filter set based on a combination of the identifier of the UE, the UE-specific application identifier, and the application-specific packet filter Set Identifier.

In another variation, the establishment or modification of the PDU session comprises identifying a Quality of Service (QoS) flow for the PDU session based on a combination of the identifier of the UE, the UE-specific application identifier, and the application-specific packet filter set identifier.

In another broad aspect, a user equipment (UE) in a network node is provided. The UE comprises a processor and a non-transient memory storing instructions executable in the processor to request an establishment or a modification of a PDU session with a session management function (SMF), a message carrying the request including an identifier of the UE; and at least one of: a UE-specific application identifier that uniquely identifies an application among a set of one or more applications implemented on the UE; and an application-specific packet filter set identifier that uniquely identifies a packet filter set among a group of one or more packet filter sets supported by the application.

In another broad aspect, a method in an Access and Mobility Management Function (AMF) of a network comprises receiving, by the AMF from a User Equipment (UE), an identifier of the UE carried in a message including a UE request for an establishment or a modification of a PDU session, and at least one of: a UE-specific application identifier that uniquely identifies an application among a set of one or more Applications supported by the UE, and an application-specific packet filter set identifier that uniquely identifies a packet filter set among a group of one or more packet filter sets supported by the application, and establishing or modifying a PDU session based on the obtained information.

In one aspect, the method further comprises converting, by the AMF, the UE-specific application identifier to an Application ID, the Application ID being unique in at least one of a set of Public Land Mobility Networks (PLMN).

In another aspect, the method further comprises selecting, by the AMF, a Session Management Function (SMF) based at least in part on the Application ID.

In another aspect, the method further comprises selecting, by the SMF, at least one User Plane Function (UPF) of the network based at least in part on the Application ID.

In yet another aspect, the method further comprises selecting, by the AMF, at least one of a network function via a Network Repository Function (NRF), a Network Slice Instance (NSI) and a set of Session Management Function (SMF) instances based at least in part on the Application ID.

A technical effect of the present invention is that it enables unstructured PDU sessions having multiple QoS flows to be established and managed in the network, with less NAS signalling overhead than conventional techniques.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

In the following description, features of the present invention are described by way of example embodiments. For convenience of description, these embodiments make use of features and terminology known from communication system specifications, such as 4G and 5G networks, as defined by the Third Generation Partnership Project (3GPP). However, it shall be understood that the present invention is not limited to such networks. Furthermore, reference in the present disclosure to particular 3GPP technical specifications, such as TS 23.501, for example, shall be understood to also apply to counterpart technical specifications and standards applicable to other networks, as well as successor specifications and standards that may be developed in the future.

Figure 1:
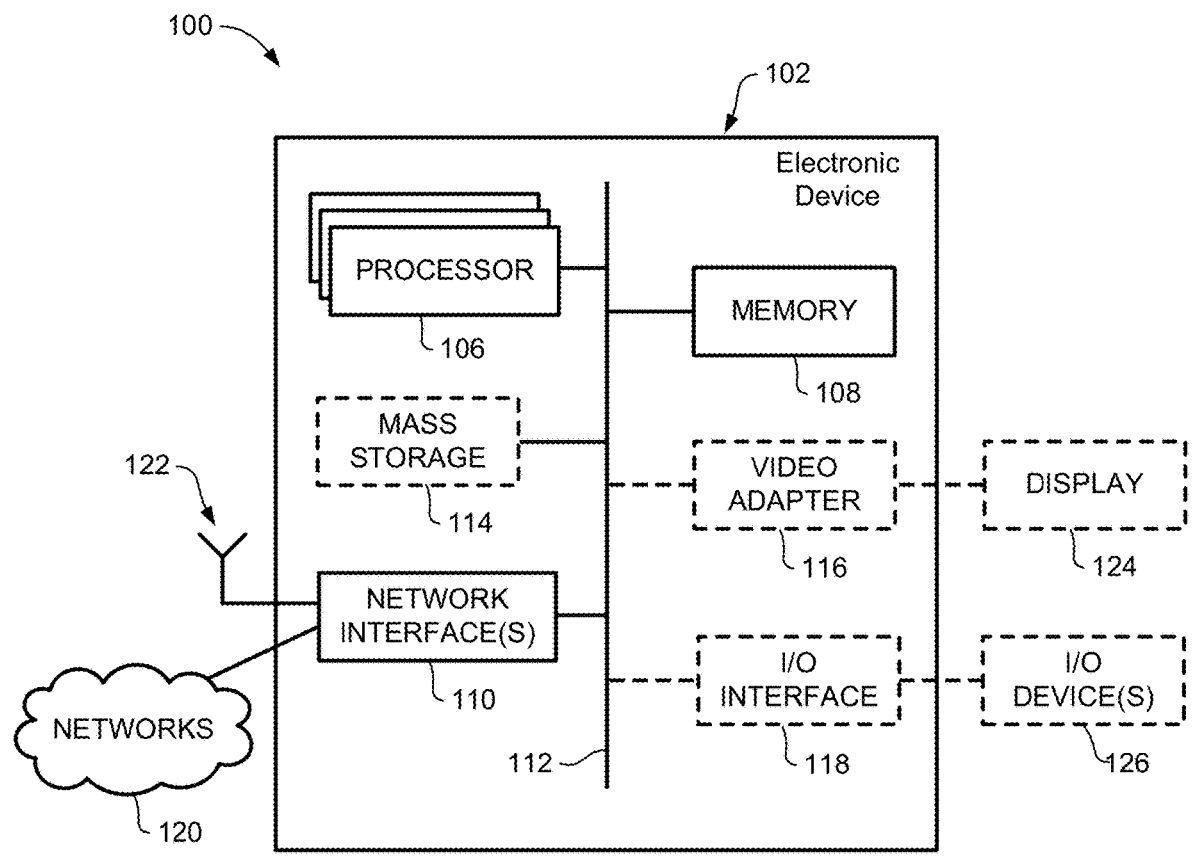
FIG. 1 is a block diagram of an electronic device within a computing and communications environment that may be used for implementing devices and methods in accordance with representative embodiments of the present invention.

FIG. 1 is a block diagram of an electronic device (ED) 102 illustrated within a computing and communications environment 100 that may be used for implementing the devices and methods disclosed herein. In some embodiments, the electronic device 102 may be an element of communications network infrastructure, such as a base station (for example a NodeB, an enhanced Node B (eNodeB), a next generation NodeB (sometimes referred to as a gNodeB or gNB)), a home subscriber server (HSS), a gateway (GW) such as a packet gateway (PGW) or a serving gateway (SGW) or various other nodes or functions within an evolved packet core (EPC) network. In other embodiments, the electronic device 102 may be a device that connects to network infrastructure over a radio interface, such as a mobile phone, smart phone or other such device that may be classified as a User Equipment (UE). In some embodiments, ED 102 may be a Machine Type Communications (MTC) device (also referred to as a machine-to-machine (m2m) device), or another such device that may be categorized as a UE despite not providing a direct service to a user. In some references, an ED 102 may also be referred to as a mobile device (MD), a term intended to reflect devices that connect to mobile network, regardless of whether the device itself is configured for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 102 typically includes a processor 106, such as a Central Processing Unit (CPU), and may further include specialized processors such as a Graphics Processing Unit (GPU) or other such processor, a memory 108, a network interface 110 and a bus 112 to connect the components of ED 102. ED 102 may optionally also include components such as a mass storage device 114, a video adapter 116, and an I/O interface 118 (shown in dashed lines).

The memory 108 may comprise any type of non-transitory system memory, readable by the processor 106, such as static random-access memory (SRAM), dynamic random access memory (DRAM), synchronous DRAM (SDRAM), read-only memory (ROM), or a combination thereof. In specific embodiments, the memory 108 may include more than one type of memory, such as ROM for use at boot-up, and DRAM for program and data storage for use while executing programs. The bus 112 may be one or more of any type of several bus architectures including a memory bus or memory controller, a peripheral bus, or a video bus.

The electronic device 102 may also include one or more network interfaces 110, which may include at least one of a wired network interface and a wireless network interface. As illustrated in FIG. 1, network interface 110 may include a wired network interface to connect to a network 120, and also may include a radio access network interface 122 for connecting to other devices over a radio link. When ED 102 is network infrastructure, the radio access network interface 122 may be omitted for nodes or functions acting as elements of the Core Network (CN) other than those at the radio edge (e.g. an eNB). When ED 102 is infrastructure at the radio edge of a network, both wired and wireless network interfaces may be included. When ED 102 is a wirelessly connected device, such as a User Equipment, radio access network interface 122 may be present and it may be supplemented by other wireless interfaces such as WiFi network interfaces. The network interfaces 110 allow the electronic device 102 to communicate with remote entities such as those connected to network 120.

The mass storage 114 may comprise any type of non-transitory storage device configured to store data, programs, and other information and to make the data, programs, and other information accessible via the bus 112. The mass storage 114 may comprise, for example, one or more of a solid-state drive, hard disk drive, a magnetic disk drive, or an optical disk drive. In some embodiments, mass storage 114 may be remote to the electronic device 102 and accessible through use of a network interface such as interface 110. In the illustrated embodiment, mass storage 114 is distinct from memory 108 where it is included, and may generally perform storage tasks compatible with higher latency, but may generally provide lesser or no volatility. In some embodiments, mass storage 114 may be integrated with a memory 108 to form an heterogeneous memory.

The optional video adapter 116 and the I/O interface 118 (shown in dashed lines) provide interfaces to couple the electronic device 102 to external input and output devices. Examples of input and output devices include a display 124 coupled to the video adapter 116 and an I/O device 126 such as a touch-screen coupled to the I/O interface 118. Other devices may be coupled to the electronic device 102, and additional or fewer interfaces may be utilized. For example, a serial interface such as Universal Serial Bus (USB) (not shown) may be used to provide an interface for an external device. Those skilled in the art will appreciate that in embodiments in which ED 102 is part of a data center, I/O interface 118 and Video Adapter 116 may be virtualized and provided through network interface 110.

In some embodiments, electronic device 102 may be a standalone device, while in other embodiments electronic device 102 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

Figure 2:
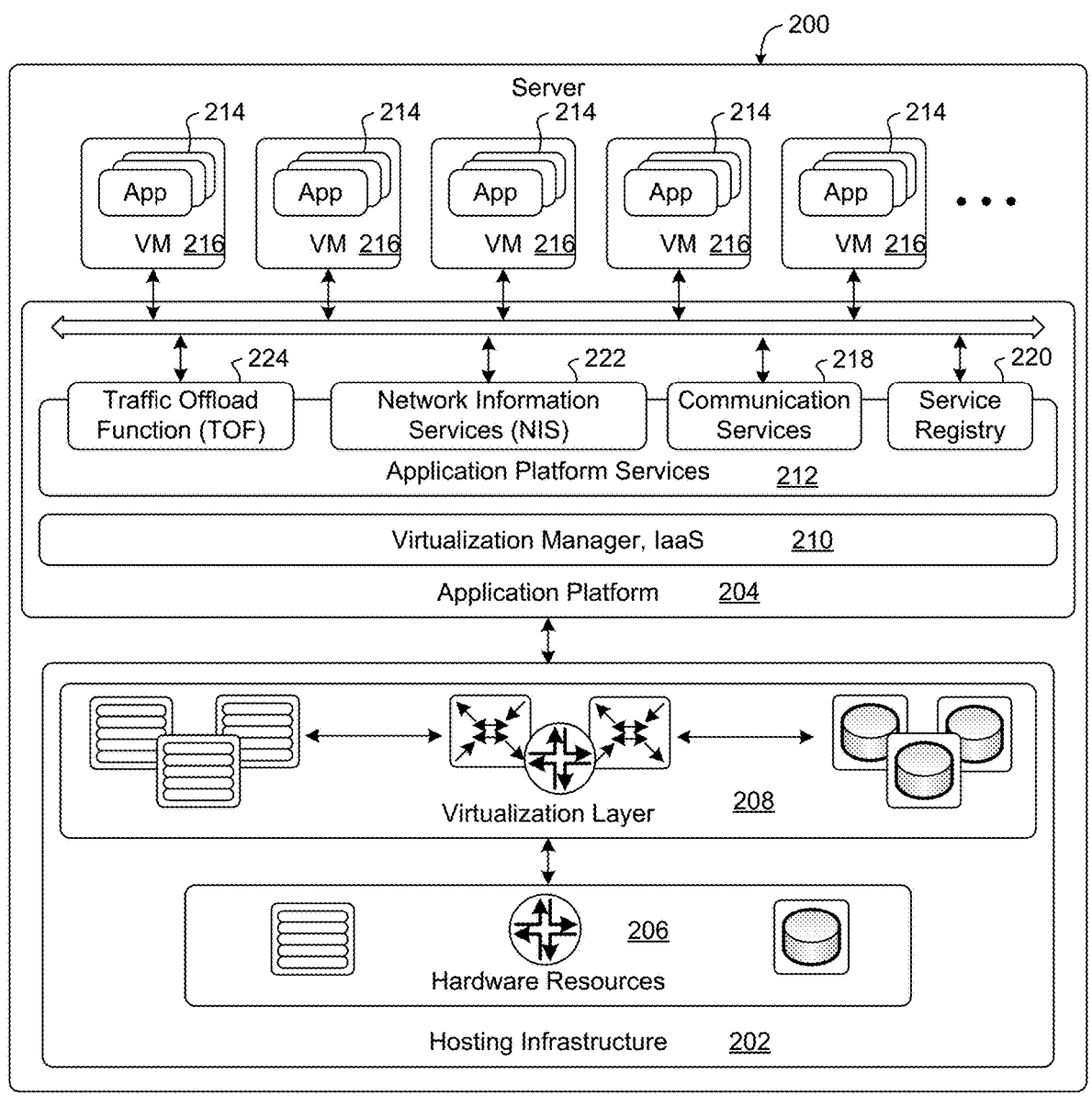
FIG. 2 is a block diagram illustrating a logical platform under which an Electronic Device can provide virtualization services.

FIG. 2 is a block diagram schematically illustrating an architecture of a representative server 200 usable in embodiments of the present invention. It is contemplated that the server 200 may be physically implemented as one or more computers, storage devices and routers (any or all of which may be constructed in accordance with the system 100 described above with reference to FIG. 1) interconnected together to form a local network or cluster, and executing suitable software to perform its intended functions. Those of ordinary skill will recognize that there are many suitable combinations of hardware and software that may be used for the purposes of the present invention, which are either known in the art or may be developed in the future. For this reason, a figure showing the physical server hardware is not included in this specification. Rather, the block diagram of FIG. 2 shows a representative functional architecture of a server 200, it being understood that this functional architecture may be implemented using any suitable combination of hardware and software. It will also be understood that server 200 may itself be a virtualized entity. Because a virtualized entity has the same properties as a physical entity from the perspective of another node, both virtualized and physical computing platforms may serve as the underlying resource upon which virtualized functions are instantiated.

As may be seen in FIG. 2, the illustrated server 200 generally comprises a hosting infrastructure 202 and an application platform 204. The hosting infrastructure 202 comprises the physical hardware resources 206 (such as, for example, information processing, traffic forwarding and data storage resources) of the server 200, and a virtualization layer 208 that presents an abstraction of the hardware resources 206 to the Application Platform 204. The specific details of this abstraction will depend on the requirements of the applications being hosted by the Application layer (described below). Thus, for example, an application that provides traffic forwarding functions may be presented with an abstraction of the hardware resources 206 that simplifies the implementation of traffic forwarding policies in one or more routers. Similarly, an application that provides data storage functions may be presented with an abstraction of the hardware resources 206 that facilitates the storage and retrieval of data (for example using Lightweight Directory Access Protocol—LDAP). The virtualization layer 208 and the application platform 204 may be collectively referred to as a Hypervisor.

The application platform 204 provides the capabilities for hosting applications and includes a virtualization manager 210 and application platform services 212. The virtualization manager 210 supports a flexible and efficient multi-tenancy run-time and hosting environment for applications 214 by providing Infrastructure as a Service (IaaS) facilities. In operation, the virtualization manager 210 may provide a security and resource "sandbox" for each application being hosted by the platform 204. Each "sandbox" may be implemented as a Virtual Machine (VM) 216 that may include an appropriate operating system and controlled access to (virtualized) hardware resources 206 of the server 200. The application-platform services 212 provide a set of middleware application services and infrastructure services to the applications 214 hosted on the application platform 204, as will be described in greater detail below.

Applications 214 from vendors, service providers, and third-parties may be deployed and executed within a respective Virtual Machine 216. For example, MANagement and Orchestration (MANO) functions and Service Oriented Network Auto-Creation (SONAC) functions (or any of Software Defined Networking (SDN), Software Defined Topology (SDT), Software Defined Protocol (SDP) and Software Defined Resource Allocation (SDRA) controllers that may in some embodiments be incorporated into a SONAC controller) may be implemented by means of one or more applications 214 hosted on the application platform 204 as described above. Communication between applications 214 and services in the server 200 may conveniently be configured according to the principles of Service-Oriented Architecture (SOA) known in the art.

Communication services 218 may allow applications 214 hosted on a single server 200 to communicate with the application-platform services 212 (through pre-defined Application Programming Interfaces (APIs) for example) and with each other (for example through a service-specific API).

A service registry 220 may provide visibility of the services available on the server 200. In addition, the service registry 220 may present service availability (e.g. status of the service) together with the related interfaces and versions. This may be used by applications 214 to discover and locate the end-points for the services they require, and to publish their own service end-point for other applications to use.

Mobile-edge Computing allows cloud application services to be hosted alongside virtualized mobile network elements in data centers that are used for supporting the processing requirements of the Cloud-Radio Access Network (C-RAN). For example, eNodeB or gNB nodes may be virtualized as applications 214 executing in a VM 216. Network Information Services (NIS) 222 may provide applications 214 with low-level network information. For example, the information provided by NIS 222 may be used by an application 214 to calculate and present high-level and meaningful data such as: cell-ID, location of the subscriber, cell load and throughput guidance.

A Traffic Off-Load Function (TOF) service 224 may prioritize traffic, and route selected, policy-based, user-data streams to and from applications 214. The TOF service 224 may be supplied to applications 214 in various ways, including: A Pass-through mode where (either or both of uplink and downlink) traffic is passed to an application 214 which can monitor, modify or shape it and then send it back to the original Packet Data Network (PDN) connection (e.g. 3GPP bearer); and an End-point mode where the traffic is terminated by the application 214 which acts as a server.

As may be appreciated, the server architecture of FIG. 2 is an example of Platform Virtualization, in which each Virtual Machine 216 emulates a physical computer with its own operating system, and (virtualized) hardware resources of its host system. Software applications 214 executed on a virtual machine 216 are separated from the underlying hardware resources 206 (for example by the virtualization layer 208 and Application Platform 204). In general terms, a Virtual Machine 216 is instantiated as a client of a hypervisor (such as the virtualization layer 208 and application-platform 204) which presents an abstraction of the hardware resources 206 to the Virtual Machine 216.

Other virtualization technologies are known or may be developed in the future that may use a different functional architecture of the server 200. For example, Operating-System-Level virtualization is a virtualization technology in which the kernel of an operating system allows the existence of multiple isolated user-space instances, instead of just one. Such instances, which are sometimes called containers, virtualization engines (VEs) or jails (such as a "FreeBSD jail" or "chroot jail"), may emulate physical computers from the point of view of applications running in them. However, unlike virtual machines, each user space instance may directly access the hardware resources 206 of the host system, using the host systems kernel. In this arrangement, at least the virtualization layer 208 of FIG. 2 would not be needed by a user space instance. More broadly, it will be recognised that the functional architecture of a server 200 may vary depending on the choice of virtualisation technology and possibly different vendors of a specific virtualisation technology.

Figure 3:
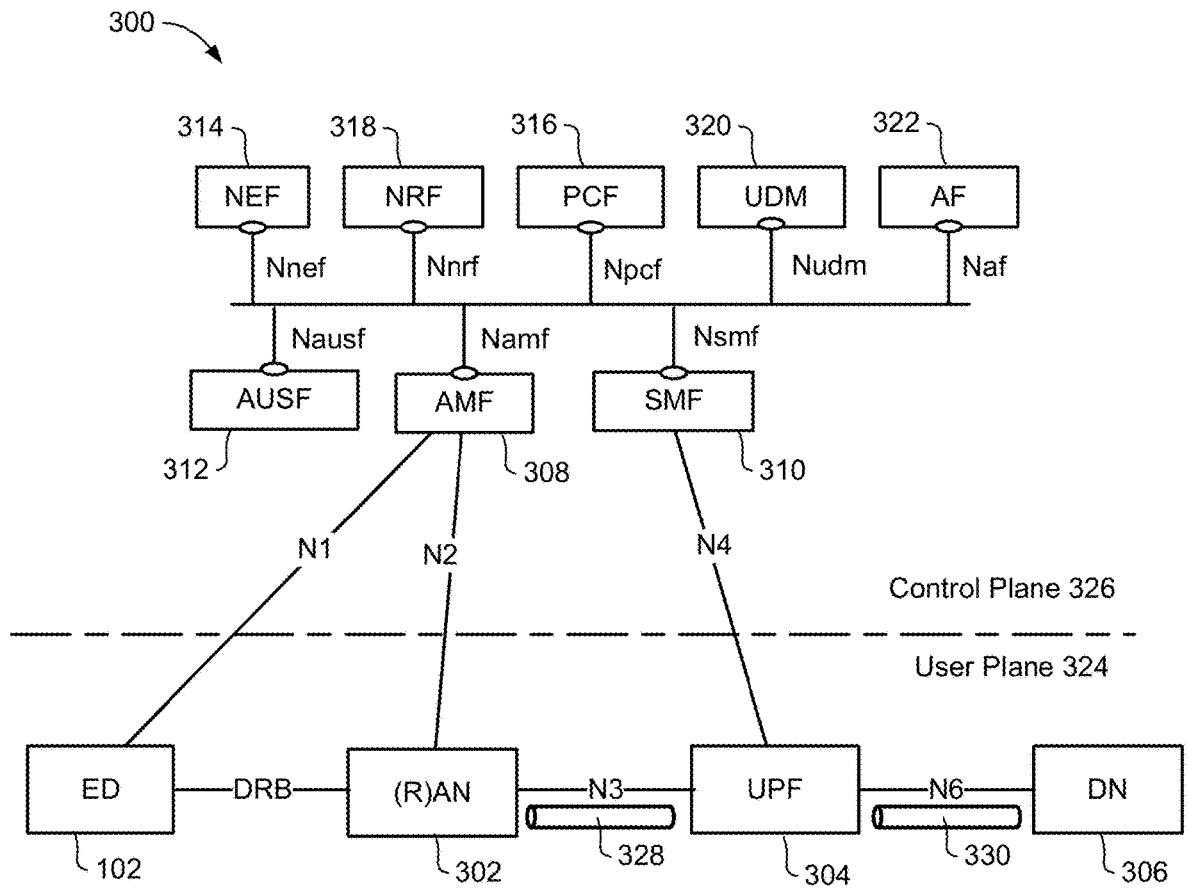
FIG. 3 is a block diagram illustrating a service-based view of a system architecture of a 5G Core Network in which embodiments of the present invention may be implemented.

FIG. 3 illustrates a service-based architecture 300 for a 5G or Next Generation Core Network (5GCN/NGCN/NCN). This illustration depicts logical connections between nodes and functions, and its illustrated connections should not be interpreted as direct physical connections. ED 102 forms a radio access network connection with a (Radio) Access Network ((R)AN) node 302 (which may, for example, be an gNodeB (gNB)), which is connected to a User Plane (UP) Function (UPF) 304 such as a UP Gateway over a network interface providing a defined interface such as an N3 interface. UPF 304 provides a logical connection to a Data Network (DN) 306 over a network interface such as an N6 interface. The radio access network connection between the ED 102 and the (R)AN node 302 may be referred to as a Data Radio Bearer (DRB).

DN 306 may be a data network used to provide an operator service, or it may be outside the scope of the standardization of the Third Generation Partnership Project (3GPP), such as the Internet, a network used to provide third party service, and in some embodiments DN 306 may represent an Edge Computing network or resource, such as a Mobile Edge Computing (MEC) network.

ED 102 also connects to the Access and Mobility Management Function (AMF) 308 through a logical N1 connection (although the physical path of the connection is not direct). The AMF 308 is responsible for authentication and authorization of access requests, as well as mobility management functions. The AMF 308 may perform other roles and functions as defined by the 3GPP Technical Specification (TS) 23.501. In a service based view, AMF 308 can communicate with other core network control plane functions through a service based interface denoted as Namf.

The Session Management Function (SMF) 310 is a network function that is responsible for the allocation and management of IP addresses that are assigned to a UE as well as the selection of a UPF 304 (or a particular instance of a UPF 304) for traffic associated with a particular session of ED 102. The SMF 310 can communicate with other core network functions, in a service based view, through a service based interface denoted as Nsmf. The SME 310 may also connect to a UPF 304 through a logical interface such as network interface N4.

The Authentication Server Function (AUSF) 312, provides authentication services to other network functions over a service based Nausf interface.

A Network Exposure Function (NEF) 314 can be deployed in the network to allow servers, functions and other entities such as those outside a trusted domain to have exposure to services and capabilities within the network. In one such example, an NEF 314 can act much like a proxy between an application server outside the illustrated network and network functions such as the Policy Control Function (PCF) 316, the SMF 310, the UDM 320, and the AMF 308, so that the external application server can provide information that may be of use in the setup of the parameters associated with a data session. The NEF 314 can communicate with other network functions through a service based Nnef network interface. The NEF 314 may also have an interface to non-3GPP functions.

A Network Repository Function (NRF) 318, provides network service discovery functionality. The NRF 318 may be specific to the Public Land Mobility Network (PLMN) or network operator, with which it is associated. The service discovery functionality can allow network functions and UEs connected to the network to determine where and how to access existing network functions, and may present the service based interface Nnrf.

PCF 316 communicates with other network functions over a service based Npcf interface, and can be used to provide policy and rules to other network functions, including those within the control plane. Enforcement and application of the policies and rules is not necessarily the responsibility of the PCF 316, and is instead typically the responsibility of the functions to which the PCF 316 transmits the policy. In one such example the PCF 316 may transmit policy associated with session management to the SMF 310. This may be used to allow for a unified policy framework with which network behavior can be governed.

A Unified Data Management Function (UDM) 320 can present a service based Nudm interface to communicate with other network functions, and can provide data storage facilities to other network functions. Unified data storage can allow for a consolidated view of network information that can be used to ensure that the most relevant information can be made available to different network functions from a single resource. This can make implementation of other network functions easier, as they do not need to determine where a particular type of data is stored in the network. The UDM 320 may employ an interface, such as a UDM Front End (UDM-FE) to connect to a User Data Repository (UDR). The PCF 316 may be associated with the UDM 320 because it may be involved with requesting and providing subscription policy information to the UDR, but it should be understood that typically the PCF 316 and the UDM 320 are independent functions.

The PCF 316 may have a direct interface to the UDR. The UDM 320 can receive requests to retrieve content stored in the UDR, or requests to store content in the UDR. The UDM 320 is typically responsible for functionality such as the processing of credentials, location management and subscription management. The UDR may also support any or all of Authentication Credential Processing, User Identification handling, Access Authorization, Registration/Mobility management, subscription management, and Short Message Service (SMS) management. The UDR is typically responsible for storing data provided by the UDM 320. The stored data is typically associated with policy profile information (which may be provided by PCF 316) that governs the access rights to the stored data. In some embodiments, the UDR may store policy data, as well as user subscription data which may include any or all of subscription identifiers, security credentials, access and mobility related subscription data and session related data.

Application Function (AF) 322 represents the non-data plane (also referred to as the non-user plane) functionality of an application deployed within a network operator domain and within a 3GPP compliant network. The AF 322 interacts with other core network functions through a service based Naf interface, and may access network capability exposure information, as well as provide application information for use in decisions such as traffic routing. The AF 322 can also interact with functions such as the PCF 316 to provide application specific input into policy and policy enforcement decisions. It should be understood that in many situations the AF 322 does not provide network services to other NFs, and instead is often viewed as a consumer or user of services provided by other NFs. An application outside the 3GPP network, can perform many of the same functions as AF 322 through the use of NEF 314.

ED 102 communicates with network functions that are in the User Plane (UP) 324, and the Control Plane (CP) 326. The UPF 304 is a part of the CN UP 324 (DN 306 being outside the 5GCN). (R)AN node 302 may be considered as a part of a User Plane, but because it is not strictly a part of the CN, it is not considered to be a part of the CN UP 324. AMF 308, SMF 310, AUSF 312, NEF 314, NRF 318, PCF 316, and UDM 320 are functions that reside within the CN CP 326, and are often referred to as Control Plane Functions. AF 322 may communicate with other functions within CN CP 326 (either directly or indirectly through the NEF 314), but is typically not considered to be a part of the CN CP 326.

Those skilled in the art will appreciate that there may be a plurality of UPFs connected in series between the (R)AN node 302 and the DN 306, and multiple data sessions to different DNs can be accommodated through the use of multiple UPFs in parallel.

User Plane (UP) packets flows to and from a particular ED 102. UP packets are normally routed between the (R)AN node 302 connected to the ED 102, and the DN 306 using General Packet Radio Service (GPRS) Tunneling Protocol (GTP) tunnels 328 and possibly IP-based tunnel 330 established through the N3 and N6 interfaces, respectively. In some examples, connections between (R)AN node 302 and a UPF 304 would make use of GTP tunnel 328. Connections between the illustrated UPF 304 and other unillustrated UPFs would also make sure of a GTP tunnel. Upon leaving the CN UP, a packet may make use of an IP-based connection between the UPF and the DN 306 instead of a GTP tunnel, especially if DN 306 is outside the domain of the operator. Typically, a GTP tunnel 328 is established between the (R)AN node 302 and the UPF 304 for each Radio Bearer between the ED 102 and the RAN node 302. In certain systems, this allows for a one-to-one relationship between Radio Bearers and GTP tunnels. Where there is a second UPF, there would usually be a corresponding GTP tunnel between the UPFs for each GTP tunnel between the (R)AN node 302 and the UPF 304. This results in each radio bearer being associated with a set of GTP tunnels forming a path through the CN UP. Each GTP tunnel may support multiple PDU sessions, and packet flows with multiple different QoS requirements. Packet flows within a GTP tunnel, such as tunnel 328, having the same QoS requirements may be grouped together as a QoS Flow, which may be identified by a given QFI. The QFI can therefore be used for queuing and prioritization of packet forwarding through the GTP tunnels 328 and 330.

At the time of PDU session establishment, the SMF 310 typically provides one or more QoS Profiles to the (R)AN node 302. These QoS Profiles contain QoS parameters for controlling the forwarding of packets having various QoS requirements. Example QoS parameters that may be included in a QoS Profile may include: 5G QoS Identifier (5QI), Allocation and Retention Priority (ARP), Reflective QoS Attribute (RQA), Guaranteed Flow Bit Rate (GFBR), Maximum Flow Bit Rate (MFBR), and Notification Control parameters.

At the time of PDU session establishment, the SMF 310 typically provides one or more QoS Rules to the ED 102. These QoS Rules contain information for controlling the forwarding of packets having various QoS requirements. Example information that may be included in a QoS Rule may include: QoS Rule Identifier; QFI, one or more packet filters and precedence values, QoS parameters (such as 5G QoS Identifier (5QI), Guaranteed Bit Rate (GBR), Maximum Bit Rate (MBR), etc.). During run-time, the ED 102 may insert the QFI into UpLink (UL) packets prior to sending them through the RB to the (R)AN node 302. Upon recipe of the UL packet from the ED 102, the (R)AN node 302 may use the QFI of the packet and the QoS Profiles to control queueing and transmission of the packet to the UPF 304.

As may be appreciated, there can be more than one QoS rule associated with a given QoS Flow. These QoS rules may contain the same QFI. In some cases, a Default QoS rule may be defined. The Default QoS rule may be the only QoS rule of a PDU session that does not contain a packet filter as currently specified in the 3GPP TS 23.501.

Figure 4:
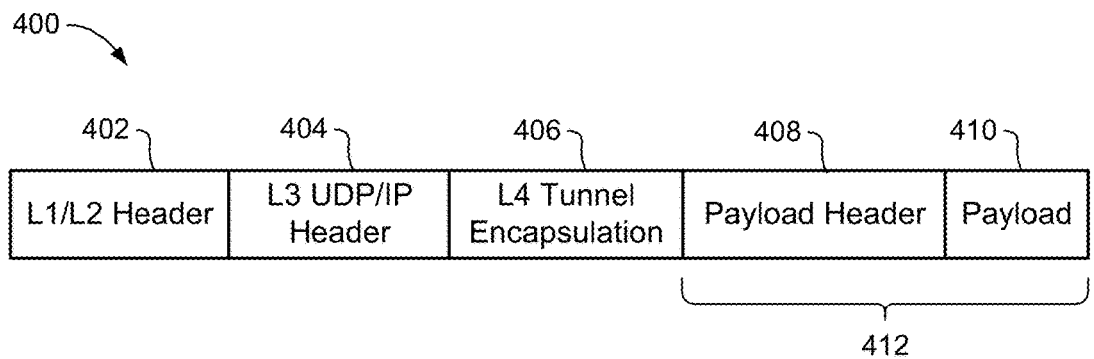
FIG. 4 is a block diagram illustrating a Protocol Data Unit (PDU) of User Plane (UP) traffic flows in the 5G Core Network (CN) of FIG. 3.

FIG. 4 is a block diagram illustrating a User-Plane Protocol Data Unit (UP-PDU) 400 used to transport User-Plane traffic through a tunnel in the core network. In some embodiments, the tunnel may be a GTP tunnel such as tunnel 328 described above with reference to FIG. 3. In general terms, the PDU 400 includes an L1/L2 header 402, a L3 UDP/IP header 404, an L4 Tunnel Encapsulation information (also referred to as an L4 tunnel encapsulation header) 406, and a payload 412 that may include at least a Payload header 408 and a Payload 410.

The L1/L2 header 402 is used to route traffic on specific media, such as optical cable or wireless link. Those skilled in the art will appreciate that from the perspective of an L1/L2 entity, the L3 header 404, L4 encapsulation information 406 and the payload 412 may all appear to be a payload.

The L3 UDP/IP header 404 typically contains IP addresses and UDP port numbers of the packet source and destination, which will normally be the UPF 304 and the (R)AN node 302. From the perspective of an L3 entity, the L4 tunnel encapsulation information 406 and the payload 412 may all appear to be a payload.

The L4 Tunnel Encapsulation information will typically include tunnel specific information such as a Tunnel Endpoint Identifier (TEID) identifying the GTP tunnel 328, as well as Quality of Service (QoS) Flow Identity (QFI) and RQI information of packet flows within the GTP tunnel 328. Where a non-GTP tunnel is employed, other tunnel identifying information may be employed in place of the GTP TEID The Payload header 408 and Payload 410 comprise the application-layer Protocol Data Unit (PDU) 412 that is sent and received by an application executing on the ED 102. Typically, the QoS requirement of the application-layer PDU 412 is determined by the application executed in the ED 102, and will normally be indicated by one or more QoS parameters inserted in the Payload header 408.

The 5G standards currently provide support for so-called "structured" PDU sessions (i.e. those in which the application-layer PDUs 412 are any one of IPv4, IPv6 and Ethernet packets). As a result, when the application-layer PDU 412 conforms to one of the IPv4, IPv6 and Ethernet standards, the UPF 304 can analyse the Payload header 408 to read a QoS parameter(s) stored within the payload header and determine the appropriate QFI for the packet. Those skilled in the art will appreciate that in some part, this is due to the knowledge of where to start reading the QFI information based on a known structure of the other headers in the packet or PDU 400. A wide variety of other PDU formats can be transported through the 5G network, using the UP-PDU 400, but these are treated as "unstructured". Among other things, the unstructured nature of such packets means that the UPF 304 cannot analyse the Payload header 408 to read its QoS parameter, and so cannot determine an appropriate QFI for the packet. Although it is possible to establish different PDU sessions for application-layer PDU flows having respective different QoS requirements, this solution increases management signalling and overhead, which is undesirable.

The present invention provides techniques enabling one unstructured PDU Session to support multiple QoS flows.

Each UE may support a limited number of applications. For example, an Internet of Things (IoT) UE may support only 1 or 2 applications. For the purposes of the present disclosure, these applications are called UE-Specific Applications. A UE-Specific Application Identifier is used to identify each UE-Specific Application instantiated on a particular UE. For the case of an IoT UE that supports only 1 or 2 applications, the UE-Specific Application Identifier can be as small as a single bit, which can be either 0 or 1 to represent two applications.

For each UE-Specific Application, there exists a limited number of Packet Filter Sets. For example, a particular UE-Specific Application may be associated with up to 8 different Packet Filter Sets. For the purposes of the present disclosure, each of these Packet Filter Sets is called an Application-Specific Packet Filter Set. Each Application-Specific Packet Filter Set may be identified using a respective Application-Specific Packet Filter Set Identifier. For the case of a UE-Specific Application associated with up to 8 different Packet Filter Sets, the Application-Specific Packet Filter Set Identifier can be as small as three bits in length.

As may be appreciated, the UE-Specific Application Identifier and the Application-Specific Packet Filter Set Identifier are unique only among the UE-Specific Applications and Application-Specific Packet Filter Sets implemented in respect of a particular UE or a UE group. Accordingly, a particular application implemented on a particular UE can be identified by the combination of the UE identifier and the UE-Specific Application Identifier. Similarly, a particular Packet Filter Set implemented on a particular UE can be identified by the combination of the UE identifier, the UE-Specific Application Identifier and the Application-Specific Packet Filter Set Identifier.

Current NAS messages (e.g. PDU Session Establishment/ Modification procedures) include Packet Filters that are identified using long bit strings. For example, conventional IP Packet Filters may include 16 bytes for the source and destination IP Addresses. In embodiments of the present invention, the UE-Specific Application ID may require 1 byte, and the Application-Specific Packet Filter Sets may require 1 byte. In some embodiments, the NAS messages may not even carry Packet Filters. Thus the control message signalling overhead is reduced significantly.

In some embodiments, the UE has its own logic to select the QoS rules and add the QoS flow identifier (QFI) to the PDU, without using a Packet Filter Set. In some embodiments, the UE uses pre-configured or derived Packet Filter Sets to classify a PDU into QoS flows. In some embodiments, the UE uses SMF-provided Packet Filter Sets to classify PDU into QoS flows. The UE may add a QFI corresponding to the PDU classification to the PDU, for example in a predetermined field of the N3/N9 tunnel encapsulation header 406.

In some embodiments, the UPF may be preconfigured with one or more packet detection rules, or the SMF may provide one or more packet detection rules during PDU Session Establishment or PDU Session Modification procedures. A packet detection rule may contain one or more Packet Filter Sets. The UPF may add a QFI corresponding to the PDU classification to the PDU, for example in a predetermined field of the N3/N9 tunnel encapsulation header 406.

The Packet Filter Sets may be or may not be standardized. If the Packet Filter Sets are not standardized, a third party service provider may provide the packet filter information to the mobile network operator (MNO) to support PDU classification in the UE and UPF.

A UE may be pre-configured to support one or several UE-Specific Applications. Each UE-Specific Application is represented by a UE-Specific Application Identifier. The information on which applications a UE can support is stored in the UDR. The Application Information may include any one or more of:

description of the UE-Specific Application, UE-Specific Application Identifier,
Application Server (AS) information (such as IP Addresses or IP Prefixes, UDP ports),
Application Function (AF) information (such as AF ID, security protocol),
N6 tunnel protocol (such as IP/UDP),
Application-Specific Packet Filter Sets, and
Corresponding Application-Specific Packet Filter Set Identifiers.

The PCF and SMF may access the UDR (via UDM in case of SMF) to obtain some or all of the Application Information. Alternatively, the PCF and/or SMF may be pre-configured with the Application Information. For example, during PDU Session Establishment or PDU Session Modification procedure, the SMF or PCF may access or receive notification from the UDR (via the UDM in case of SMF) to obtain the Application Information.

The UE may be pre-configured with relevant information from the Application Information, such as Application Server information, UE-Specific Applications, UE-Specific Application Identifiers, Application-Specific Packet Filter Sets for UL direction and optionally Application-Specific Packet Filter Sets for DL direction. Each Application-Specific Packet Filter Set has a corresponding Application-Specific Packet Filter Set Identifier. Alternatively, the CN may send Application Information to the UE by using a UE Update procedure, such as UE Configuration Update procedure as specified in clause 4.2.4 of 3GPP TS 23.502, or e.g. when UE requests PDU Session Establishment or Modification procedures as specified in clauses 4.3.2 and 4.3.3 of 3GPP TS 23.502. In a case in which the UE supports only one application, the Application Server information and/or Application Identifier may not be provided or pre-configured in the UE.

The UE-Specific Application and Application-Specific Packet Filter Sets may be not standardized in 3GPP technical specifications. The UE may be provided or pre-configured with Application-Specific QoS Rule(s), each of which has an Application-Specific QoS Rule identifier, one Application-Specific Packet Filter Set, and a QoS Flow Identifier (QFI). The MNO may inform the Application Provider (such as represented by the AF function) about the mapping between the Application-Specific Packet Filter Set and the Application-Specific Packet Filter Set Identifier, and Application-Specific QoS Rules. The Application Provider may use the information provided by the MNO to configure the UEs.

Since the number of Application-Specific Packet Filter Set Identifiers is small (for example. 8 or 16), the signaling overhead between UE and CN can be significantly reduced, compared to conventional techniques where one or more whole Packet Filter Sets are transmitted in the messages of the PDU Session Modification procedure.

The UEs may be pre-configured (or provided by CN functions, for example), in a particular PDU Session to use standardized Application-Specific Packet Filter Sets and non-standardized Application-Specific Packet Filter Sets. A standardized Application-Specific Packet Filter Set may comprise standardized Application-Specific Packet Filter Sets in the UL direction, and optionally standardized Application-Specific Packet Filter Sets in the DL direction. In the standardized Application-Specific Packet Filter Set, the fields of the packet may be defined in 3GPP technical specifications. When a UE is served by a Visiting PLMN (V-PLMN), the V-PLMN CP functions (V-PCF or V-SMF) may get the non-standardized Application-Specific Packet Filter Sets from the Home PLMN (H-PLMN) CP functions (H-PCF or H-SMF).

In some embodiments, the order of Application-Specific Packet Filter Sets in the UE may or may not be the same as the order of Application-Specific Packet Filter Sets in the CN functions (SMF, PCF, UDR), provided that the intended Application-Specific Packet Filter Set can be unambiguously identified by the Application-Specific Packet Filter Set ID.

The UE can request one unstructured PDU Session for one UE-Specific Application, or for multiple UE-Specific Applications.

When the UE requests a PDU Session Establishment or Modification, the UE provides UE-Specific Application Identifiers and for each UE-Specific Application Identifier, a list of Application-Specific Packet Filter Set Identifiers, to indicate which QoS flows the UE may use. For each UE-Specific Application Identifier, the CN function (such as SMF) may provide UEs with an ordered list of QFIs, which implicitly provide a one-to-one mapping between the QFI and Application-Specific Packet Filter Set Identifiers provided by the UE. Alternatively, the SMF may explicitly provide a list of all mappings between QFI and each Application-Specific Packet Filter Set Identifier. Alternatively, the SMF may provide multiple lists of QFIs, each list of QFI may relate to one UE-Specific Application Identifier, and the order of QFIs may be the same as the order of Application-Specific Packet Filter Set Identifiers.

If the UE has only one application (indicated in the application information of UE Subscription data), the UE may not need to provide UE-Specific Application Identifier in the PDU Session Establishment/Modification Request. The Data Network Name (DNN) of the Data Network (DN) that hosts UE-Specific Application(s) can be used to identify the UE-Specific Application(s) and Application-Specific Packet Filter Sets.

In another implementation, a mapping between QFI and Application-Specific Packet Filter Set Identifier for each UE-Specific Application may be pre-configured in the UE and in the CN. In this case, the UE does not need to send Application-Specific Packet Filter Set Identifiers.

Information the SMF may provide:
- to UE: QoS Rules and QFI, each QoS rule includes a UL (and optionally DL) Application-Specific Packet Filter Set, Application-Specific Packet Filter Set Identifier, and may include UE-Specific Application Identifier.
- to RAN: QoS Profile and QFI
- to UPF: SDF template (including Packet Filter Set), QFI, and N6 tunnel information.

Unstructured Packet Filter Set

For unstructured PDU Session Type, the Packet Filter Set may support packet filtering based on (1) N6 Tunnel Information and (2) Application-Specific Packet Filter Set In the DL direction, the Packet Filter Set include the (1) N6 Tunnel Information and (2) Application-Specific Packet Filter Set.

In the UL direction, the Packet Filter Set include the (2) Application-Specific Packet Filter Set.

If the N6 Tunnel Information is point to point IP/UDP tunnel, the N6 Tunnel Information may include any one or more of:
- Source/destination IP address or IPv6 prefix.
- Source/destination port number.
- Protocol ID of the protocol above IP/Next header type.
- Type of Service (TOS) (IPv4)/Traffic class (IPv6) and Mask.
- Flow Label (IPv6).
- Security parameter index.
- Packet filter direction.

NOTE 1: A value left unspecified in a filter matches any value of the corresponding information in a packet.

NOTE 2: An IP address or Prefix may be combined with a prefix mask.

NOTE 3: Port numbers may be specified as port ranges.

The Application-Specific Packet Filter Sets may be stored in the UDR, provided either by AF or pre-configured by OAM.

Example Embodiment 1—Solution to Support UE Configured for One Application with Non-GBR QoS Flows This embodiment represents a simple case, in which the UE has 1 application requiring non-GBR QoS flows.

If the UE supports only 1 application, only non-GBR QoS flows. In the present disclosure, terms similar to "the UE supports an application" shall be understood to mean that the UE is configured to implement the application, or example by executing software instructions in accordance with the application.

The Application-Specific Packet Filter Sets are non-standardized, and not specified in the 3GPP Technical Specifications.

Each Application-Specific Packet Filter Set has an Application-Specific Packet Filter Set ID. The UE and CP functions use the Application-Specific Packet Filter Set ID to reduce the signaling overhead.

The UE uses the Application-Specific Packet Filter Set to map UL packet to QoS Flow.

The UPF uses the Application-Specific Packet Filter Set and N6 protocol header information to map DL packet to QoS Flow.

Description of UE
- UE has 1 UE-Specific Application,
- non-standardized Application-Specific Packet Filter Sets,
- Application-Specific Packet Filter Set Identifiers,
- all QoS Flows are non-GBR,
- each QoS flow has one 5QI if non-GBR, which replaces QFI.

When requesting PDU Session Establishment/Modification, the UE does not include UE-Specific Application ID and may include the DNN that host the application (as specified in the TS 23.501.). The DNN may be used to identify the UE-Specific Applications The UE may not need to include the DNN to save the signaling overhead. The CP function may recognize the default DNN of DN that hosts UE-Specific Application(s).

The UE uses the Packet Filters to map PDU to 5QI, the 5QI is used as QFI for UL direction.

In the PDU Session Modification Request, the UE uses Application-Specific Packet Filter Set Identifiers, instead of Packet Filters, to indicate the modification will be applied to which Application-Specific Packet Filter Set.

CN Network Information SMF behavior

The UDR, PCF and thus SMF have UE-Specific Applications, and non-standardized Application-Specific Packet Filter Sets and Application-Specific Packet Filter Set Identifiers. The SMF may have preconfigured UE-Specific Application ID(s), and non-standardized Application-Specific Packet Filter Sets and Application-Specific Packet Filter Set Identifier(s). Alternatively, the SMF may obtain the UE-Specific Application ID(s), and non-standardized Application-Specific Packet Filter Sets and Application-Specific Packet Filter Set Identifiers from the UDR via the UDM as part of Session Management Subscription data. The SMF may obtain the UE-Specific Application ID(s), and non-standardized Application-Specific Packet Filter Sets and Application-Specific Packet Filter Set Identifiers from the PCF as part of policy and charging rules, for example as part of packet detection rules (PDR) and/or packet forwarding action rules (FAR).

If the QoS flows are non-GBR, the SMF does not send QoS Rules to the UE in the N1 SM Container for PDU Session Establishment response (for example as described in TS 23.502, PDU Session Establishment procedure, step 11 "N1 SM container (PDU Session Establishment Accept (S-NSSAI, Session-AMBR, selected PDU Session Type)))".

The SMF provides (R)AN with QoS Profiles, each includes a 5QI.

The SMF uses the default DNN of UE to establish UPF (as specified in the TS 23.501).

The UPF use N6 tunnel information and Packet Filters to map PDU to DL 5QI, the DL 5QI is used as DL QFI.

In the PDU Session Modification Request procedure, the SMF and PCF use Application-Specific Packet Filter Set Identifiers, instead of Packet Filters, to indicate the modification will be applied to which Application-Specific Packet Filter Set when sending messages to the UE.

Benefit(s)/Advantage(s) of Example Embodiment 1

Example Embodiment 1 may provide either one or both of the following benefits:
- The use of the Application-Specific Packet Filter Set Identifier(s) means that details of packet filters of unstructured data do not need to be detailed in the 3GPP Technical Specifications.
- The use of the Application-Specific Packet Filter Set Identifier(s) reduces signaling overhead in NAS messages, while still supporting multiple QoS flows in unstructured PDU sessions Example Embodiment 2—Solution to Support UE Designed for One Application with Non-GBR and GBR QoS Flows This embodiment is similar to Embodiment 1, but the UE has 1 application requiring GBR and non-GBR QoS flows.

Description of UE
- UE has 1 UE-Specific Application,
- Non-standardized Application-Specific Packet Filter Sets,
- Application-Specific Packet Filter Set Identifiers,
- some QoS Flows are GBR,
- each QoS flow has one QFI (or QFI is the same as 5QI if non-GBR).

When requesting PDU Session Establishment/Modification, the UE does not include UE-Specific Application ID and may include the DNN that host the application (as specified in the TS 23.501.). The DNN may be used to identify the UE-Specific Application ID(s).

The UE may not need to include the DNN to save the signaling overhead.

CN Network Information SMF Behavior

TS 23.502, PDU Session Establishment procedure, step 11 "N1 SM container (PDU Session Establishment Accept (QoS Rule(s), S-NSSAI, Session-AMBR, selected PDU Session Type))."

For non-GBR QoS Flows, the SMF does not send the QoS rules to the UE.

For GBR QoS Flows, the SMF sends QoS rules to the UE. In the NAS message, each QoS rule includes the Application-Specific Packet Filter Set Identifiers, not the Application-Specific Packet Filter Sets, and QFI.

The Application-Specific Packet Filters can be modified. The AF may provide the new Application-Specific Packet Filter Sets to the CN via NEF. The NEF stores the new Application-Specific Packet Filter Sets to the UDR. The UDR informs PCFs about new Application-Specific Packet Filter Sets. The PCF provides Application-Specific Packet Filter Sets update to:

(1) AMF so that the Application-Specific Packet Filter Sets and Application-Specific Packet Filter Set Identifiers can be provided to the UE by using UE Configuration Update procedure (2) SMF so that the Application-Specific Packet Filter Sets and Application-Specific Packet Filter Set Identifiers, can be sent to the UE, and/or UPF by using PDU Session Modification procedure.

The SMF sends all QoS Profiles for both GBR and non-GBR QoS Flows together with QFIs, to (R)AN.

The SMF sends all SDF templates to the UPF for both GBR and non-GBR QoS Flows.

Benefit(s)/Advantage(s) of Example Embodiment 2

The benefits of this example embodiment are similar to those in Example Embodiment 1. With some more details to include dynamic QFI assignment from the SMF to the UE in PDU Session Establishment/Modification procedures.

Example Embodiment 3—Solution to Support UE Designed for Multiple Applications with Non-GBR and GBR QoS Flows

- The UE-Specific Application ID and Application-Specific Packet Filter Set ID are used in NAS messages to reduce the signalling overhead.
- The AMF may convert UE-Specific Application ID to another Application ID which is unique in a PLMN or multiple PLMN.
- The AMF may use Application ID for SMF selection.
- The SMF may use Application ID for UPF selection.

Description of UE

Similar to UE configurations 1 and 2, the difference is that UE support multiple UE-Specific Applications, and one DN may support multiple UE-Specific Applications. (Note that the case the case the one DN supports only one UE-Specific Application is similar to the Embodiments 1 and 2).

- The UE supports multiple UE-Specific Applications,
- Each UE-Specific Application has a UE-Specific Application Identifier.
- Non-standardized Application-Specific Packet Filter Sets,
- Application-Specific Packet Filter Set Identifiers,
- some QoS Flows are GBR,
- each QoS flow has one QFI (or QFI is the same as 5QI if non-GBR).

One unstructured PDU Session can support one or more of UE-Specific Applications. The UE indicates UE-Specific Application Identifiers in PDU Session Establishment Request message. The UE can also indicate specific Application-Specific Packet Filter Set Identifiers in the PDU Session Establishment Request message.

TS 23.502: In the PDU Session Establishment procedure, step 1: "From UE to AMF: NAS Message (S-NSSAI(s), DNN, UE-Specific Application Identifiers, PDU Session ID, Request type, Old PDU Session ID, N1 SM container (PDU Session Establishment Request))."

"The PDU Session Establishment Request may include a Requested PDU Type, a Requested SSC mode, Protocol Configuration Options, SM PDU DN Request Container, UE-Specific Application Identifiers, Application-Specific Packet Filter Set Identifiers."

In case one DN supports multiple UE-Specific Applications, the UE may include UE-Specific Application Identifiers in step 1. The UE may not need to provide the UE-Specific Application Identifiers in the N1 SM container since the DNN may be used to identify the UE-Specific Application(s).

In TS 23.502, PDU Session Modification procedure, clause 4.3.3.2,

"1a. (UE initiated modification) The UE initiates the PDU Session Modification procedure by the transmission of an NAS message (N1 SM container (PDU Session Modification Request (UE-Specific Application ID, Application-Specific Packet Filter Set Identifiers, Operation, Requested QoS, Segregation)), PDU Session ID) message."

- The UE may include UE-Specific Application ID, Application-Specific Packet Filter Set Identifiers to represent the Packet Filters.
- If the Application-Specific Packet Filter Set Identifiers are unique for the all UE-Specific Applications, the UE-Specific Application ID may be omitted.

CN Network Information SMF Behavior

Similar to Embodiments 1 and 2, the SMF and PCF have relevant information from the Application Information. The SMF may have preconfigured UE-Specific Application ID(s), and non-standardized Application-Specific Packet Filter Sets and Application-Specific Packet Filter Set Identifiers. Alternatively, the SMF may obtain the UE-Specific Application ID(s), and non-standardized Application-Specific Packet Filter Sets and Application-Specific Packet Filter Set Identifiers from the UDR via the UDM as part of Session Management Subscription data. The SMF may obtain the UE-Specific Application ID(s), and non-standardized Application-Specific Packet Filter Sets and Application-Specific Packet Filter Set Identifiers from the PCF as part of policy and charging rules, for example as part of packet detection rules (PDR) and/or packet forwarding action rules (FAR).

The AMF may use UE-Specific Application Identifiers (locally stored in the AMF or provided by the UE in PDU Session Request message) for SMF selection in the SMF Selection procedure of TS 23.502, clause 4.3.2.2.3.

The AMF may convert UE-Specific Application Identifiers to another Application Identifier, which could be unique in a PLMN, or multiple PLMNs.

The AMF may provide Application ID to the NSSF to select an NRF and optionally an NSI ID.

The AMF may provide Application ID to the NRF to select a set of SMF instances.

In case of roaming, during the UE registration procedure, the V-AMF may get Application Information of H-PLMN by requesting the V-UDM (the V-UDM may get the Application from the V-UDR).

The SMF may use Application ID to select UPF (The UPF selection by the SMF is described in TS 23.501, clause 6.3.3)

In TS 23.502, PDU Session Establishment procedure, step 11: The SMF sends to the UE "N1 SM container (PDU Session Establishment Accept (QoS Rule(s), S-NSSAI, Session-AMBR)".

If the Application-Specific Packet Filter Set is not changed, the QoS Rule(s) for one QoS Flow may include UE-Specific Application ID, and Application Specific Packet Filter Set ID, (not the whole Packet Filters), QFI, QoS parameters.

If the Application-Specific Packet Filter Set is modified, the QoS Rule(s) for one QoS Flow may include UE-Specific Application ID, and Application Specific Packet Filter Set, QFI, QoS parameters.

In TS 23.502, PDU Session Modification procedure, clause 4.3.3.2, In step 3, the SMF sends to the UE "N1 SM container (PDU Session Modification Command (PDU Session ID, QoS rule(s), QoS rule operation, Session-AMBR)))."

Benefit(s)/Advantage(s) of Embodiment 3

Similar benefits as those of Example Embodiments 1 and 2.

3.3.4 Embodiment 4—Solution to Support Multiple QFIs for One Packet Filter Set When the UE is configured to support only one or more of application, and each application has one or more of Application-Specific Packet Filter Set. It is required to support multiple QoS Flows (multiple QFIs) for one Application-Specific Packet Filter Set.

The CN (SMF) assigns multiple QoS Rules to the UE, each consists of the same Application-Specific Packet Filter Set, and different QFI.

For each UL packet, the UE has its own logic to select QoS Rule and add QFI to the UL packet.

The SMF may configure the UPF with different N6 parameter set, each set is mapped to one QFI. For example, if the N6 interface use IP/UDP protocol, the SMF may assign multiple IP Addresses or IP Prefixes, each for one QoF Flow (QFI).

When receiving UL PDU in N3/N9 interface, the UPF remove the N3/N9 header, and use the corresponding configured IP header to the UL packet.

The AS use the UL packet header information to configure the DL packet header. For example, the IP Header of DL packet Description of UE Two or more QoS Rules may have the same Application-Specific Packet Filter Set. This scenario is applied to the case that there is one UE-Specific Application, The UE has its own logic to select a QoS Rule and add QFI to the UL packets.

CN Network Information SMF Behavior

The SMF may configure the N6 interface to carry QoS Flows

If the IP/UDP protocol is used for N6 interface, the QFI in the N3 or N9 tunnel header can be mapped to some fields of IP/UDP header, for example

- The SMF may assign different IP addresses/prefixes to UPF for N6 interface, each IP address/prefix is assigned to one QFI.
- The UDP port (Source or Destination ports): One UDP port may be assigned to one QFI.
- The AS may use the UL IP/UDP header information to create DL packet header. For example, the response from AS for a UL packet will be sent to the Source IP (or Source Port) of UL packet.

The UPF uses the N6 packet header information, and the Application-Specific Packet Filter Set to map DL packets to QFI.

Benefit(s)/Advantage(s) of Example Embodiment 4

- Reduce signaling overhead for PDU Session Establishment/Modification procedures.
- Support 1 Packet Filter Set having multiple QoS requirements.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

Figure 5A:
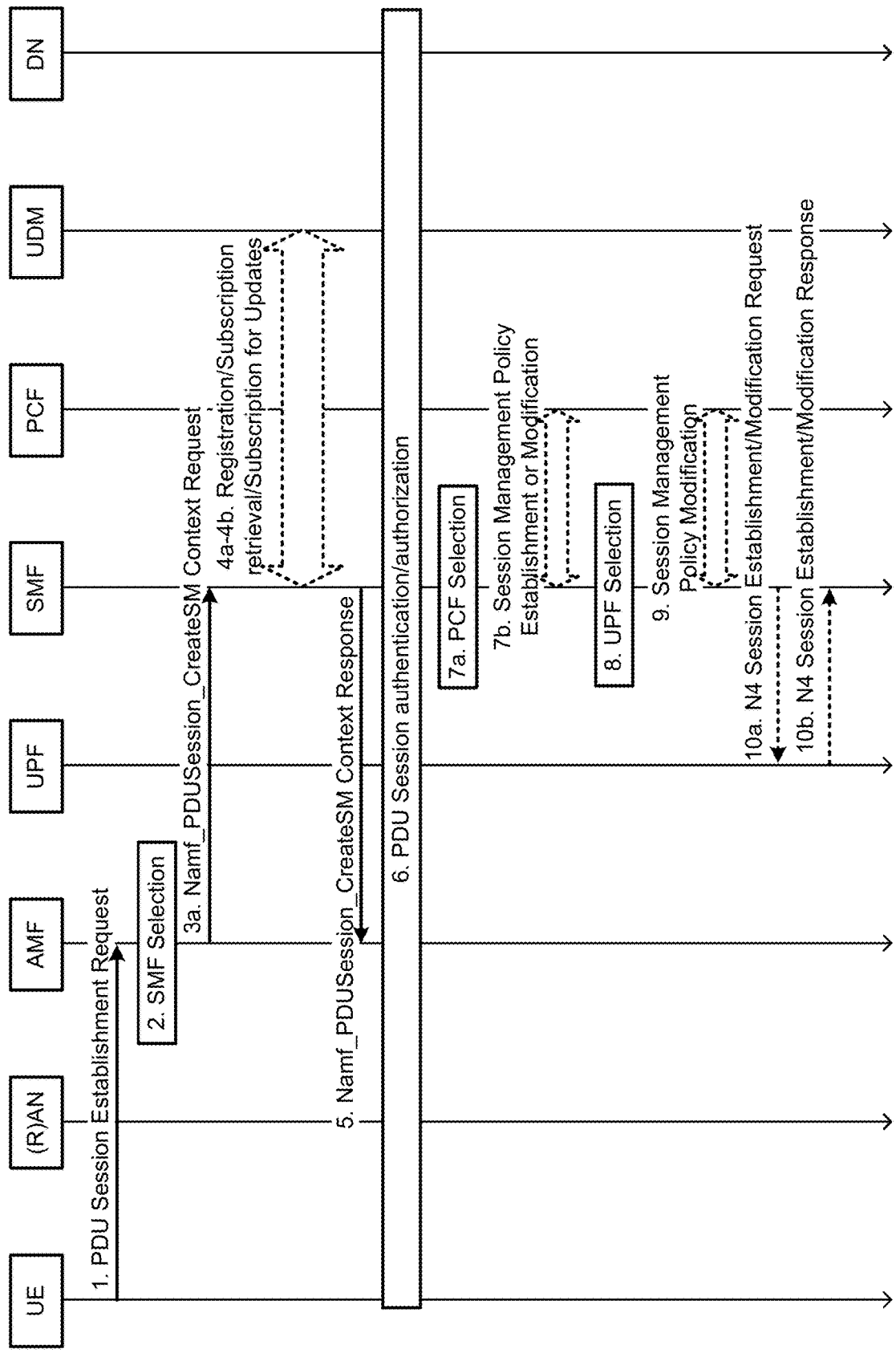
FIGS. 5A and 5B show a message flow diagram illustrating a representative process for UE-requested PDU Session Establishment for non-roaming and roaming with local breakout, which may be used in embodiments of the present invention.
Figure 5B:
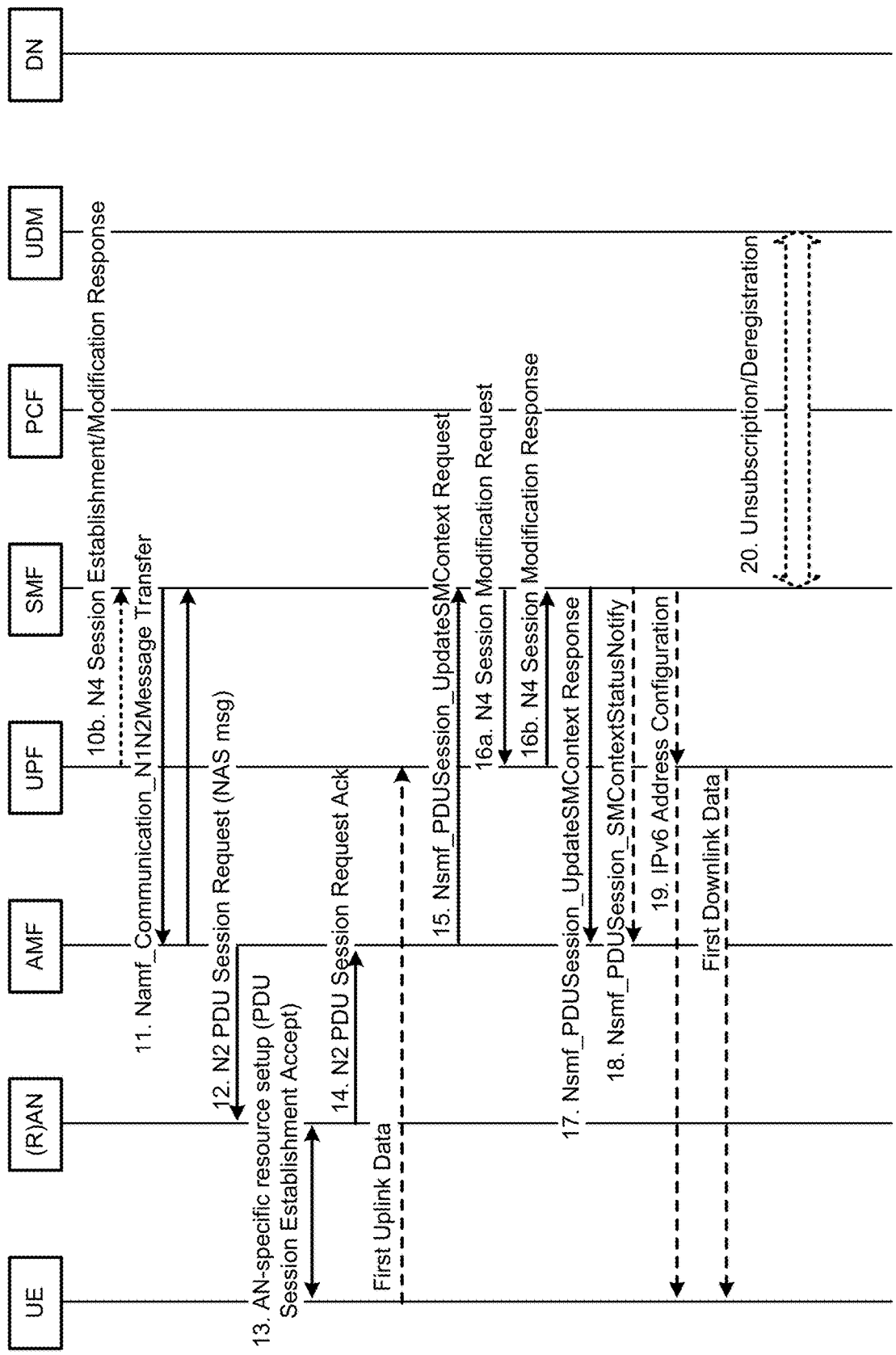

UE-Requested PDU Session Establishment for Non-Roaming and Roaming with Local Breakout FIGS. 5A-5B illustrate a representative process for UE-requested PDU Session Establishment for non-roaming and roaming with local breakout. This procedure assumes that the UE has already registered on the AMF thus unless the UE is Emergency registered the AMF has already retrieved the user subscription data from the UDM.

Step 1: From UE to AMF: NAS Message (S-NSSAI(s), DNN, UE-Specific Application Identifiers, PDU Session ID, Request type, Old PDU Session ID, N1 SM container (PDU Session Establishment Request)).

In order to establish a new PDU Session, the UE generates a new PDU Session ID.

The UE initiates the UE Requested PDU Session Establishment procedure by the transmission of a NAS message containing a PDU Session Establishment Request within the N1 SM container. The PDU Session Establishment Request may include a Requested PDU Type, a Requested SSC mode, Protocol Configuration Options, SM PDU DN Request Container.

One unstructured PDU Session can support one or more of UE-Specific Applications. The UE indicates UE-Specific Application Identifiers in PDU Session Establishment Request message. The UE can also indicate specific Application-Specific Packet Filter Set Identifiers in the PDU Session Establishment Request message.

In case one DN supports multiple UE-Specific Applications, the UE may include UE-Specific Application Identifiers in step 1. The UE may not need to provide the UE-Specific Application Identifiers in the N1 SM container since the DNN may be used to identify the UE-Specific Application Identifier(s).

The Request Type indicates "Initial request" if the PDU Session Establishment is a request to establish a new PDU Session and indicates "Existing PDU Session" if the request refers to an existing PDU Session switching between 3GPP access and non-3GPP access or to a PDU Session handover from an existing PDN connection in EPC. If the request refers to an existing PDN connection in EPC, the S-NSSAI is set based on the S-NSSAI received from PCO which is sent by PGW-C+SMF during PDN Connection Establishment procedure. When Emergency service is required and an Emergency PDU Session is not already established, a UE may initiate the UE Requested PDU Session Establishment procedure with a Request Type indicating "Emergency Request".

The Request Type indicates "Emergency Request" if the PDU Session Establishment is a request to establish a PDU Session for Emergency services. The Request Type indicates "Existing Emergency PDU Session" if the request refers to an existing PDU Session for Emergency services switching between 3GPP access and non-3GPP access.

The NAS message sent by the UE is encapsulated by the AN in a N2 message towards the AMF that should include User location information and Access Technology Type Information.

The PDU Session Establishment Request message may contain SM PDU DN Request Container containing information for the PDU Session authorization by the external DN.

The UE includes the S-NSSAI from the Allowed NSSAI. If the Mapping of Allowed NSSAI was provided to the UE, the UE may provide both the S-NSSAI from the Allowed NSSAI and the corresponding S-NSSAI from the Configured NSSAI for the HPLMN.

If the procedure is triggered for SSC mode 3 operation, the UE may also include the Old PDU Session ID which indicates the PDU Session ID of the on-going PDU Session to be released, in NAS message. The Old PDU Session ID is an optional parameter which is included only in this case.

The AMF receives from the AN the NAS SM message (built in step 1) together with User Location Information (e.g. Cell Id in case of the (R)AN).

The UE may not trigger a PDU Session establishment for a PDU Session corresponding to a LADN when the UE is outside the area of availability of the LADN.

Step 2: The AMF determines that the message corresponds to a request for a new PDU Session based on that Request Type indicates "initial request" and that the PDU Session ID is not used for any existing PDU Session(s) of the UE. If the NAS message does not contain an S-NSSAI, the AMF may determine a default S-NSSAI for the requested PDU Session either according to the UE subscription, if it contains only one default S-NSSAI, or based on operator policy.

The AMF selects an SMF as described in clause 4.3.2.2.3 of TS 23.502. If the Request Type indicates "Initial request" or the request is due to handover from EPS, the AMF stores an association of the S-NSSAI(s), the DNN, the PDU Session ID and the SMF ID.

The AMF may use UE-Specific Application Identifiers (locally stored in the AMF or provided by the UE in PDU Session Establishment Request) for SMF selection in the SMF Selection procedure of TS 23.502, clause 4.3.2.2.3. The AMF may convert UE-Specific Application Identifiers to another Application Identifier, which has been configured by the network management function (such as OAM function), which could be unique in a PLMN, or multiple PLMNs. The AMF may provide Application ID to the NSSF to select an NRF and optionally an NSI ID. The AMF may provide Application ID to the NRF to select a set of SMF instances.

If the Request Type is "initial request" and if the Old PDU Session ID indicating the existing PDU Session is also contained in the message, the AMF selects an SMF as described in clause 4.3.5.2 of TS 23.502 and stores an association of the new PDU Session ID, the S-NSSAI and the selected SMF ID.

If the Request Type indicates "Existing PDU Session", the AMF selects the SMF based on SMF-ID received from UDM. The case where the Request Type indicates "Existing PDU Session", and either the AMF does not recognize the PDU Session ID or the subscription context that the AMF received from UDM during the Registration or Subscription Profile Update Notification procedure does not contain an SMF ID corresponding to the PDU Session ID constitutes an error case.

If the Request Type indicates "Existing PDU Session" referring to an existing PDU Session moved between 3GPP access and non-3GPP access, then if the SMF ID (H-SMF in home-routed case) corresponding to the PDU Session ID and the AMF belong to the same PLMN, the PDU Session Establishment procedure can be performed, otherwise the AMF may reject the PDU Session Establishment Request with an appropriate reject cause.

NOTE 1: The SMF ID includes the PLMN ID that the SMF belongs to.

The AMF may reject a request coming from an UE when the UE is registered for Emergency services and the Request Type indicates neither "Emergency Request" nor "Existing Emergency PDU Session". When the Request Type indicates "Emergency Request", the AMF is not expecting any S-NSSAI and DNN value provided by the UE and uses locally configured values instead.

If the Request Type indicates "Emergency Request" or "Existing Emergency PDU Session", the AMF selects the SMF as described in TS 23.501 [2], clause 5.16.4.

Step 3: From AMF to SMF: Either Nsmf_PDUSession_CreateSMContext Request (SUPI, DNN, S-NSSAI, PDU Session ID, AMF ID, Request Type, N1 SM container (PDU Session Establishment Request), User location information, Access Type, PEI, GPSI, Subscription For PDU Session Status Notification) or Nsmf_PDUSession_UpdateSMContext Request (SUPI, DNN, S-NSSAI, PDU Session ID, AMF ID, Request Type, N1 SM container (PDU Session Establishment Request), User location information, Access Type, RAT type, PEI).

If the AMF does not have an association with an SMF for the PDU Session ID provided by the UE (e.g. when Request Type indicates "initial request"), the AMF invokes the Nsmf_PDUSession_CreateSMContext Request, but if the AMF already has an association with an SMF for the PDU Session ID provided by the UE (e.g. when Request Type indicates "existing PDU Session"), the AMF invokes the Nsmf_PDUSession_UpdateSMContext Request.

The AMF ID is the UE's GUAMI which uniquely identifies the AMF serving the UE. The AMF forwards the PDU Session ID together with the N1 SM container containing the PDU Session Establishment Request received from the UE. The GPSI may be included if available at AMF.

The AMF provides the PEI instead of the SUPI when the UE has registered for Emergency services without providing a SUPI. The PEI is defined in TS 23.501 [2] clause 5.9.3. In case the UE has registered for Emergency services with a SUPI but has not been authenticated the AMF indicates that the SUPI has not been authenticated. The SMF determines that the UE has not been authenticated when it does not receive a SUPI for the UE or when the AMF indicates that the SUPI has not been authenticated.

If the Old PDU Session ID is included in step 1, and if the SMF is not to be reallocated, the AMF also includes Old PDU Session ID in the Nsmf_PDUSession_CreateSMContext Request.

In the local breakout case, if the V-SMF is not able to process some part of the N1 SM information then Home Routed Roaming is required, and the V-SMF responds to the AMF that it is not the right SMF to handle the N1 SM message by invoking Nsmf_PDUSession_CreateSM Response service operation. The V-SMF includes a proper N11 cause code triggering the AMF to proceed with home routed case. The procedure starts again at step 2 of clause 4.3.2.2.2 of TS 23.502.

Step 4: If Request Type in step 3 indicates neither "Emergency Request" nor "Existing Emergency PDU Session" and, if the SMF has not yet registered for this PDU Session ID, then the SMF registers with the UDM using Nudm_UECM_Registration (SUPI, DNN, PDU Session ID) for a given PDU Session. As a result, the UDM stores following information: SUPI, SMF identity, SMF address and the associated DNN and PDU Session ID. If Session Management Subscription data for corresponding SUPI, DNN and S-NSSAI is not available, then SMF retrieves the Session Management Subscription data using Nudm_SDM_Get (SUPI, DNN, S-NSSAI) and subscribes to be notified when this subscription data is modified using Nudm_SDM_Subscribe (SUPI, DNN, S-NSSAI).

If the Request Type received in step 3 indicates "Emergency Request"

For an authenticated non-roaming UE, based on operator configuration (e.g. related with whether the operator uses a fixed SMF for Emergency calls, etc.), the SMF may register in the UDM using Nudm_UECM_Registration (SUPI, PDU Session ID, Indication of Emergency Services) for a given PDU Session that is applicable for emergency services. As a result, the UDM may store the SMF address and the applicable PDU Session for Emergency services.

For an unauthenticated UE or a roaming UE, the SMF may not register in the UDM for a given PDU Session.

If the Request Type in step 3 indicates "Existing PDU Session" or "Existing Emergency PDU Session" the SMF determines that the request is due to switching between 3GPP access and non-3GPP access or due to handover from EPS. The SMF identifies the existing PDU Session based on the PDU Session ID. In such a case, the SMF does not create a new SM context but instead updates the existing SM context and provides the representation of the updated SM context to the AMF in the response.

If the Request Type is "Initial request" and if the Old PDU Session ID is included in Nsmf_PDUSession_CreateSMContext Request, the SMF identifies the existing PDU Session to be released based on the Old PDU Session ID.

Subscription data includes the authorized PDU type(s), authorized SSC mode(s), default 5QI and ARP, subscribed Session-AMBR.

Static IP address/prefix may be included in the subscription data if the UE has subscribed to it.

The SMF checks the validity of the UE request: it checks whether the UE request is compliant with the user subscription and with local policies;

(If the DNN corresponds to an LADN), whether the UE is located within the LADN service area based on the UE location reporting from the AMF.

If the UE request is considered as not valid, the SMF decides to not accept to establish the PDU Session.

The SMF may have preconfigured UE-Specific Application ID(s), and non-standardized Application-Specific Packet Filter Sets and Application-Specific Packet Filter Set Identifier(s) for the uplink and/or downlink. Alternatively, the SMF may obtain the UE-Specific Application ID(s), and non-standardized Application-Specific Packet Filter Sets and Application-Specific Packet Filter Set Identifiers from the UDR via the UDM as part of Session Management Subscription data.

Step 5: From SMF to AMF: Either Nsmf_PDUSession_CreateSMContext Response(Cause, SM Context ID or N1 SM container (PDU Session Reject(Cause))) or an Nsmf_PDUSession_UpdateSMContext Response depending on the request received in step 3.

If the SMF received Nsmf_PDUSession_CreateSMContext Request in step 3 and the SMF is able to process the PDU Session establishment request, the SMF creates an SM context and responds to the AMF by providing an SM Context Identifier.

When the SMF decides to not accept to establish a PDU Session, the SMF rejects the UE request via NAS SM signalling including a relevant SM rejection cause by responding to the AMF with Nsmf_PDUSession_CreateSMContext Response. The SMF also indicates to the AMF that the PDU Session ID is to be considered as released, deregisters from UDM for this PDU Session and the rest of the procedure is skipped.

Step 6: Optional Secondary authorization/authentication.
  If the Request Type in step 3 indicates "Existing PDU Session", the SMF does not perform secondary authorization/authentication.
  If the Request Type received in step 3 indicates "Emergency Request" or "Existing Emergency PDU Session", the SMF may not perform secondary authorization/authentication.
  If the SMF needs to perform secondary authorization/authentication during the establishment of the PDU Session by a DN-AAA server as described in TS 23.501 [2] clause 5.6.6, the SMF triggers the PDU Session establishment authentication/authorization as described in clause 4.3.2.3 of TS 23.502.
  If the PDU Session establishment authentication/authorization fails, the SMF proceeds to step 19 and the PDU Session Establishment procedure is stopped.

Step 7a: If dynamic PCC is deployed, the SMF performs PCF selection. If the Request Type indicates "Existing PDU Session" or "Existing Emergency PDU Session", the SMF may use the PCF already selected for the PDU Session.
  If dynamic PCC is not deployed, the SMF may apply local policy.

Step 7b: The SMF may perform a Session Management Policy Establishment procedure as defined in clause 4.16.4 to establish a PDU Session with the PCF and get the default PCC Rules for the PDU Session. The GPSI may be included if available at SMF. If the Request Type in step 3 indicates "Existing PDU Session", the SMF may notify an event previously subscribed by the PCF by a Session Management Policy Modification procedure as defined in clause 4.16.5 and the PCF may update policy information in the SMF. The PCF may provide authorized Session-AMBR and the authorized 5QI and ARP to SMF. The PCF subscribes to the IP allocation/release event in the SMF (and may subscribe other events).
  The SMF may obtain the UE-Specific Application ID(s), and non-standardized Application-Specific Packet Filter Sets and Application-Specific Packet Filter Set Identifiers for the uplink and/or downlink from the PCF as part of policy and charging rules, for example as part of packet detection rules (PDR) and/or packet forwarding action rules (FAR).
  The PCF, based on the Emergency DNN, sets the ARP of the PCC rules to a value that is reserved for Emergency services as described in TS 23.503 [20].
  NOTE 2: The purpose of step 7 is to receive PCC rules before selecting UPF. If PCC rules are not needed as input for UPF selection, step 7 can be performed after step 8.

Step 8: If the Request Type in step 3 indicates "Initial request", the SMF selects an SSC mode for the PDU Session as described in TS 23.501 [2] clause 5.6.9.3. The SMF also selects one or more UPFs as needed as described in TS 23.501 [2] clause 6.3.3. The SMF may use the Application ID to select the one or more UPFs. In case of PDU Type IPv4 or IPv6, the SMF allocates an IP address/prefix for the PDU Session as described in TS 23.501 [2] clause 5.8.1. In case of PDU Type IPv6, the SMF also allocates an interface identifier to the UE for the UE to build its link-local address. For unstructured PDU Type the SMF may allocate an IPv6 prefix for the PDU Session and N6 point-to-point tunnelling (based on UDP/IPv6) as described in TS 23.501 [2] clause 5.6.10.3. For Ethernet PDU type PDU Session, neither a MAC nor an IP address is allocated by the SMF to the UE for this PDU Session.
  If the Request Type in Step 3 is "Existing PDU Session", the SMF maintains the same IP address/prefix that has already been allocated to the UE in the source network.
  If the Request Type in step 3 indicates "Existing PDU Session" referring to an existing PDU Session moved between 3GPP access and non-3GPP access the SMF maintains the SSC mode of the PDU Session, the current PDU Session Anchor and IP address.
  NOTE 3: The SMF may decide to trigger e.g. new intermediate UPF insertion or allocation of a new UPF as described in step 5 in clause 4.2.3.2 of TS 23.502.
  If the Request Type indicates "Emergency Request", the SMF selects the UPF as described in TS 23.501 [2], clause 5.16.4 and selects SSC mode 1.

Step 9: SMF may perform a Session Management Policy Modification procedure as defined in clause 4.16.5 to report some event to the PCF that has previously subscribed. If Request Type is "initial request" and dynamic PCC is deployed and PDU Type is IPv4 or IPv6, SMF notifies the PCF (that has previously subscribed) with the allocated UE IP address/prefix.
  NOTE 4: If an IP address/prefix has been allocated before step 7 (e.g. subscribed static IP address/prefix in UDM) or the step 7 is perform after step 8, the IP address/prefix can be provided to PCF in step 7, and the IP address/prefix notification in this step can be skipped.

Step 9: PCF may provide updated policies to the SMF. The PCF may provide authorized Session-AMBR and the authorized 5QI and ARP to SMF. The PCF may provide SMF the UE-Specific Application ID(s), and non-standardized Application-Specific Packet Filter Sets and Application-Specific Packet Filter Set Identifiers from the PCF as part of policy and charging rules, for example as part of service data flow (SDF) template, SDF filters, packet detection rules (PDR) and/or packet forwarding action rules (FAR) for the UL and/or DL.

Step 10: If Request Type indicates "initial request", the SMF initiates an N4 Session Establishment procedure with the selected UPF, otherwise it initiates an N4 Session Modification procedure with the selected UPF:
  10a: The SMF sends an N4 Session Establishment/Modification Request to the UPF and provides Packet detection, enforcement and reporting rules to be installed on the UPF for this PDU Session. If CN Tunnel Info is allocated by the SMF, the CN Tunnel Info is provided to UPF in this step. If the selective User Plane deactivation is required for this PDU Session, the SMF determine the Inactivity Timer and it provides to the UPF. The SMF may provide UPF with UE-Specific Application ID(s), and non-standardized Application-Specific Packet Filter Sets and Application-Specific Packet Filter Set Identifiers for downlink and/or uplink as part of policy and charging rules, for example as part of packet detection rules (PDR) and/or packet forwarding action rules (FAR).
  10b: The UPF acknowledges by sending an N4 Session Establishment/Modification Response. If CN Tunnel Info is allocated by the UPF, the CN Tunnel Info is provided to SMF in this step.
  If multiple UPFs are selected for the PDU Session, the SMF initiate N4 Session Establishment/Modification procedure with each UPF of the PDU Session in this step.
  If the Request Type indicates "Existing PDU Session", and the SMF creates CN Tunnel Info, then this step is skipped. Otherwise, this step is performed to obtain the CN Tunnel Info from the UPF using the N4 Session Modification Procedure.

Step 11: SMF to AMF: Namf_Communication_N1N2MessageTransfer (PDU Session ID, Access Type, N2 SM information (PDU Session ID, QFI(s), QoS Profile(s), CN Tunnel Info, S-NSSAI, Session-AMBR, PDU Session Type), N1 SM container (PDU Session Establishment Accept (QoS Rule(s), selected SSC mode, S-NSSAI, allocated IPv4 address, interface identifier, Session-AMBR, selected PDU Session Type))). In case of multiple UPFs are used for the PDU Session, the CN tunnel Info contain tunnel information related with the UPF that terminates N3.

The N2 SM information carries information that the AMF may forward to the (R)AN which includes:

The CN Tunnel Info corresponds to the Core Network address of the N3 tunnel corresponding to the PDU Session.

One or multiple QoS profiles and the corresponding QFIs can be provided to the (R)AN. This is further described in TS 23.501 [2] clause 5.7.

The PDU Session ID may be used by AN signalling with the UE to indicate to the UE the association between AN resources and a PDU Session for the UE.

A PDU Session is associated to an S-NSSAI and a DNN.

The N1 SM container contains the PDU Session Establishment Accept that the AMF may provide to the UE.

Multiple QoS Rules and QoS Profiles may be included in the PDU Session Establishment Accept within the N1 SM and in the N2 SM information.

The Namf_Communication_N1N2MessageTransfer further contains the PDU Session ID and information allowing the AMF to know which access towards the UE to use.

For non-GBR QoS Flows, the SMF may not send the QoS rules to the UE.

If the QoS flows are non-GBR, the SMF may not send the following information in the PDU Session Establishment Accept: QoS Rules, selected SSC mode, and allocated IPv4 address, interface identifier. Alternatively, the SMF may send the selected QoS Rules and PDU Session Type to the UE in the N1 SM Container for PDU Session Establishment response in the N1 SM container (PDU Session Establishment Accept (QoS Rules, S-NSSAI, Session-AMBR, selected PDU Session Type)". The QoS rules may include UE-Specific Application ID(s), and Application-Specific Packet Filter Sets and Application-Specific Packet Filter Set Identifiers for the uplink and downlink.

The SMF may send all QoS Profiles for both GBR and non-GBR QoS Flows together with QFIs, to (R)AN.

The SMF may send all SDF templates to the UPF for both GBR and non-GBR QoS Flows.

If the Application-Specific Packet Filter Set is not changed, the QoS Rule(s) for one QoS Flow may include UE-Specific Application ID, and Application Specific Packet Filter Set ID, (not the whole Packet Filters), QFI, QoS parameters.

If the Application-Specific Packet Filter Set is modified, the QoS Rule(s) for one QoS Flow may include UE-Specific Application ID, and Application Specific Packet Filter Set, QFI, QoS parameters.

NOTE 5: The access information is to deal with the case where a UE is simultaneously connected over 3GPP and Non 3GPP access.

Step 12: AMF to (R)AN: N2 PDU Session Request (N2 SM information, NAS message (PDU Session ID, N1 SM container (PDU Session Establishment Accept))).

The AMF sends the NAS message containing PDU Session ID and PDU Session Establishment Accept targeted to the UE and the N2 SM information received from the SMF within the N2 PDU Session Request to the (R)AN.

Step 13: (R)AN to UE: The (R)AN may issue AN specific signalling exchange with the UE that is related with the information received from SMF. For example, in case of a 3GPP (R)AN, an RRC Connection Reconfiguration may take place with the UE establishing the necessary (R)AN resources related to the QoS Rules for the PDU Session request received in step 12.

(R)AN also allocates (R)AN N3 tunnel information for the PDU Session. In case of Dual Connectivity, the Master (R)AN node may assign some (zero or more) QFIs to be setup to a Master (R)AN node and others to the Secondary (R)AN node. The AN Tunnel Info includes a tunnel endpoint for each involved (R)AN node, and the QFIs assigned to each tunnel endpoint. A QFI can be assigned to either the Master (R)AN node or the Secondary (R)AN node and not to both.

(R)AN forwards the NAS message (PDU Session ID, N1 SM container (PDU Session Establishment Accept)) provided in step 12 to the UE. (R)AN may only provide the NAS message to the UE if the necessary (R)AN resources are established and the allocation of (R)AN tunnel information are successful.

Step 14: (R)AN to AMF: N2 PDU Session Response (PDU Session ID, Cause, N2 SM information (PDU Session ID, AN Tunnel Info, List of accepted/rejected QFI(s))).

The AN Tunnel Info corresponds to the Access Network address of the N3 tunnel corresponding to the PDU Session.

Step 15: AMF to SMF: Nsmf_PDUSession_UpdateSMContext Request (N2 SM information, Request Type).

The AMF forwards the N2 SM information received from (R)AN to the SMF.

If the list of rejected QFI(s) is included in N2 SM information, the SMF may release the rejected QFI(s) associated QoS profiles.

Step 16a: The SMF initiates an N4 Session Modification procedure with the UPF. The SMF provides AN Tunnel Info to the UPF as well as the corresponding forwarding rules.

NOTE 6: If the PDU Session Establishment Request was due to mobility between 3GPP and non-3GPP access or mobility from EPC, the downlink data path is switched towards the target access in this step.

Step 16b: The UPF provides an N4 Session Modification Response to the SMF.

If multiple UPFs are used in the PDU Session, the UPF in step 16 refers to the UPF terminating N3.

Step 17: SMF to AMF: Nsmf_PDUSession_UpdateSMContext Response (Cause).

The SMF may subscribe to the UE mobility event notification from the AMF (e.g. location reporting, UE moving into or out of area of interest), after this step by invoking Namf_EventExposure_Subscribe service operation as specified in clause 5.2.2.3.2 of TS 23.502. For LADN, the SMF subscribes to the UE moving into or out of LADN service area event notification by providing the LADN DNN as an indicator for the area of interest (see clause 5.6.5 and 5.6.11 of TS 23.501 [2]).

After this step, the AMF forwards relevant events subscribed by the SMF.

Step 18: [Conditional] SMF to AMF: Nsmf_PDUSession_ SMContextStatusNotify (Release)

If during the procedure, any time after step 5, the PDU Session establishment is not successful, the SMF informs the AMF by invoking Nsmf_PDUSession_SMContextStatusNotify(Release). The SMF also releases any N4 session(s) created, any PDU Session address if allocated (e.g IP address) and releases the association with PCF, if any.

Step 19: SMF to UE, via UPF: In case of PDU Type IPv6, the SMF generates an IPv6 Router Advertisement and sends it to the UE via N4 and the UPF.

Step 20: If the PDU Session cannot be established, then the SMF may perform the following:

a) The SMF unsubscribes to the modifications of Session Management Subscription data for the corresponding (SUPI, DNN, S-NSSAI), using Nudm_SDM_Unsubscribe (SUPI, DNN, S-NSSAI), if the SMF is no more handling a PDU Session of the UE for this (DNN, S-NSSAI).

b) The SMF deregisters for the given PDU Session using Nudm_UECM_Deregistration (SUPI, DNN, PDU Session ID).

UE-Requested PDU Session Establishment for Home-Routed Roaming Scenarios

Figure 6A:
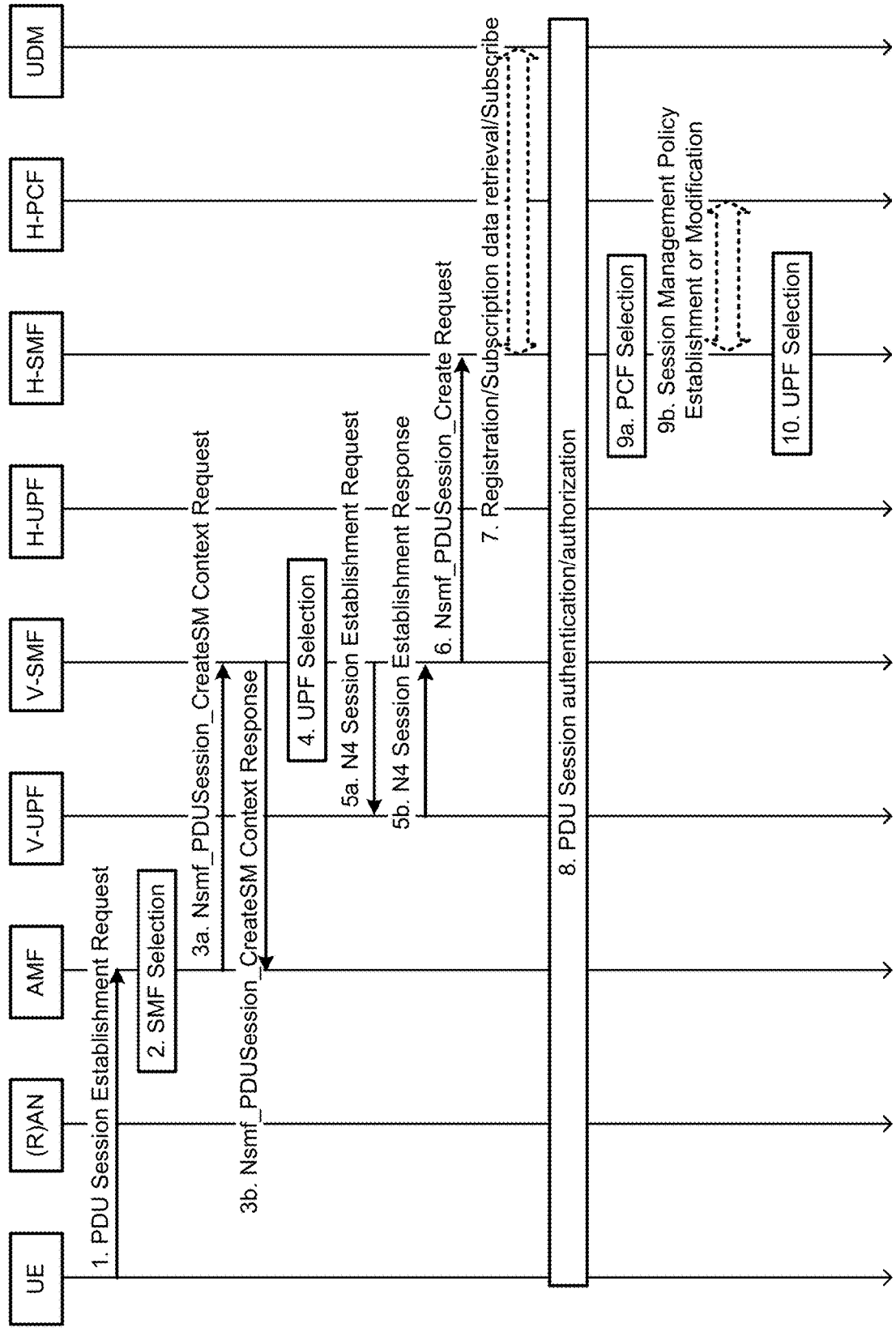
FIGS. 6A-6C show a message flow diagram illustrating a representative process for UE-requested PDU Session Establishment for home-routed roaming scenarios, which may be used in embodiments of the present invention.
Figure 6B:
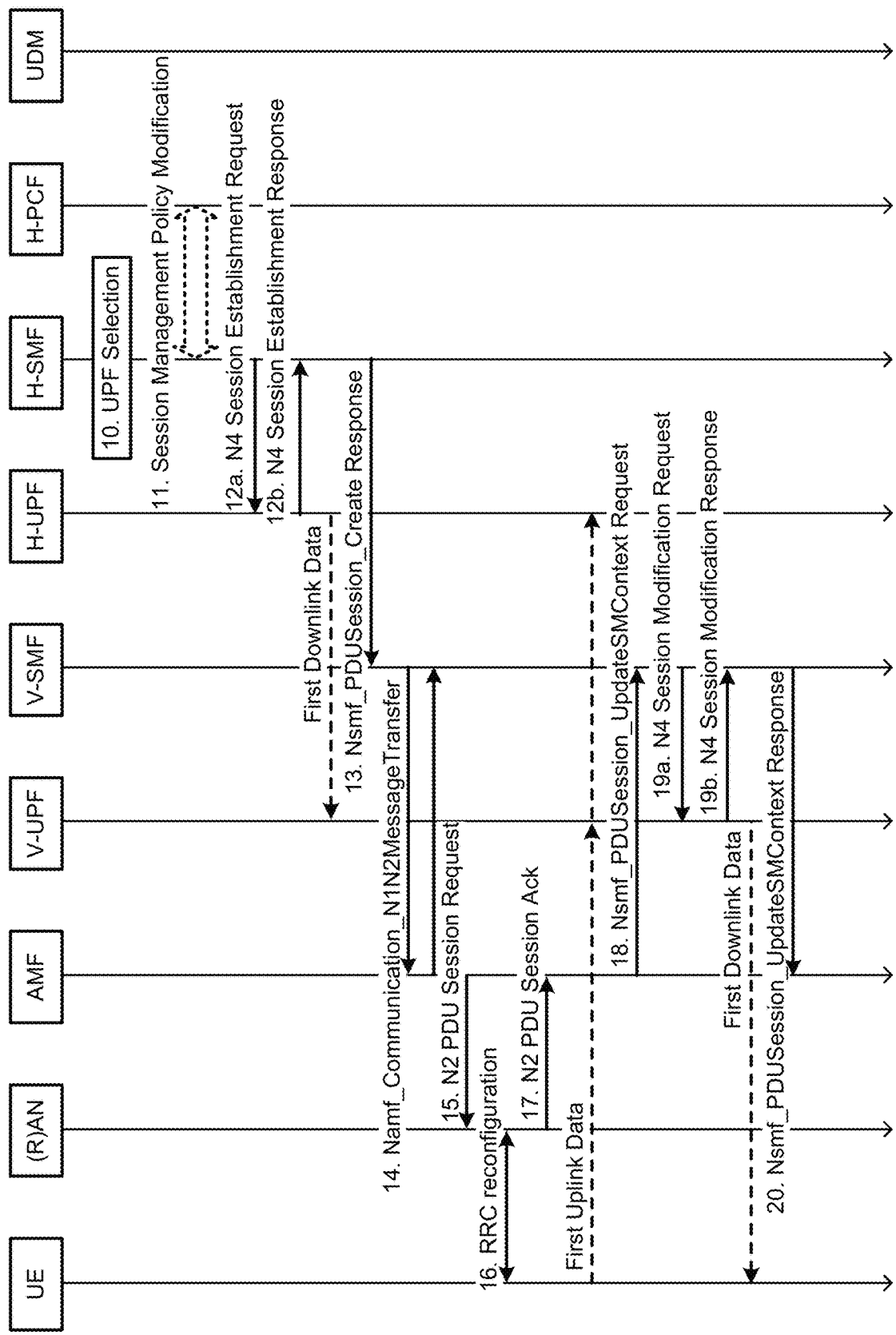
Figure 6C:
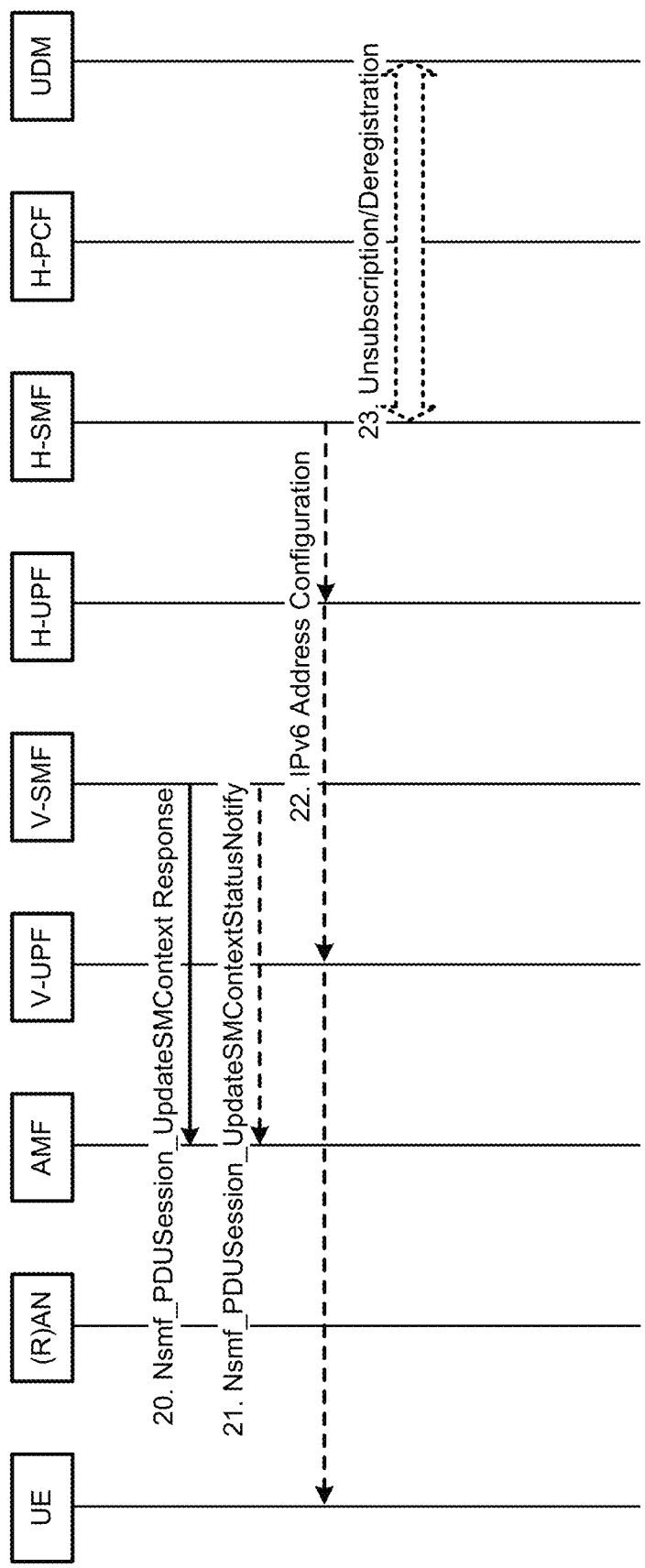

FIGS. 6A-6c illustrate a representative process for UE-requested PDU Session Establishment for home-routed roaming scenarios.

Step 1: This step is the same as step 1 of FIGS. 5A-5B.

Step 2: As in step 2 of FIGS. 5A-5B with the addition that the AMF also selects a SMF in HPLMN using the S-NSSAI with the value defined by the HPLMN, as described in clause 4.3.2.2.3. The AMF stores the association of the S-NSSAI, the DNN, the PDU Session ID and the SMF ID in VPLMN.

In step 3 of FIGS. 5A-5B, in local breakout roaming case, if V-SMF responds to AMF indicating that V-SMF is not able to process some part of the N1 SM information, the AMF proceeds with home routed case from this step and may select an SMF in the VPLMN different from the V-SMF selected earlier.

Step 3a: As in step 3 of FIGS. 5A-5B with the addition that the AMF also provides the identity of the SMF in HPLMN it has selected in step 2 and the S-NSSAI with the value defined by the HPLMN. The H-SMF is provided when the PDU Session is home-routed. The N1 SM container contains the PDU Session Establishment Request received from the UE. GPSI may be provided to the V-SMF by the AMF if available at AMF.

3b: This step is the same as step 5 of FIGS. 5A-5B.

Step 4: The V-SMF selects a UPF in VPLMN as described in TS 23.501 [2], clause 6.3.3.

In Step 5 The V-SMF initiates an N4 Session Establishment procedure with the selected V-UPF:

5a: The V-SMF sends an N4 Session Establishment Request to the V-UPF. If CN Tunnel Info is allocated by the SMF, the CN Tunnel Info is provided to V-UPF in this step.

5b: The V-UPF acknowledges by sending an N4 Session Establishment Response. If CN Tunnel Info is allocated by the V-UPF, the CN Tunnel Info is provided to V-SMF in this step.

Step 6: V-SMF to H-SMF: Nsmf_PDUSession_Create Request (SUPI, GPSI (if available), DNN, S-NSSAI with the value defined by the HPLMN, PDU Session ID, V-SMF ID, V-CN-Tunnel-Info, PDU type, Protocol Configuration Options, User location information, SM PDU DN Request Container). Protocol Configuration Options may contain information that H-SMF may needs to properly establish the PDU Session (e.g. SSC mode or SM PDU DN Request Container to be used to authenticate the UE by the DN-AAA as defined in clause 4.3.2.3).

Steps 7-12: These steps are the same as steps 4-10 in FIGS. 5A-5B with the following differences:
These steps are executed in Home PLMN;
The H-SMF stores an association of the PDU Session and V-SMF ID for this PDU Session for this UE.
The H-SMF does not provides the Inactivity Timer to the H-UPF as described in step 9a in clause 4.3.2.2.1.
Step 5 of FIGS. 5A-5B is not executed.

Step 13: H-SMF to V-SMF: Nsmf_PDUSession_Create Response (QoS Rule(s), Protocol Configuration Options including session level information that the V-SMF is not expected to understand, selected PDU Session Type and SSC mode, H-CN Tunnel Info, QFI(s), QoS profile(s), Session-AMBR, information needed by V-SMF in case of EPS interworking such as the PDN Connection Type)

The information that the H-SMF may provide is the same as that defined for step 11 of FIGS. 5A-5B.
The H-CN Tunnel Info contains the tunnel information for uplink traffic towards H-UPF.
Multiple QoS Rules may be included in the Nsmf_PDUSession_Create Response.

Steps 14-18: These steps are the same as steps 11-15 FIGS. 5A-5B with the following differences:
These steps are executed in Visited PLMN;
The V-SMF stores an association of the PDU Session and H-SMF ID for this PDU Session for this UE.

19a: The V-SMF initiates an N4 Session Modification procedure with the V-UPF. The V-SMF provides Packet detection, enforcement and reporting rules to be installed on the V-UPF for this PDU Session, including AN Tunnel Info, H-CN Tunnel Info and V-CN Tunnel Info.

Step 19b: The V-UPF provides a N4 Session Modification Response to the V-SMF.

After this step, the V-UPF delivers any down-link packets to the UE that may have been buffered for this PDU Session.

Step 20: This step is the same as step 17 in FIGS. 5A-5B. with the following differences:
The SMF is a V-SMF Step 21: This step is same as step 18 in FIGS. 5A-5B.

Step 22: H-SMF to UE, via H-UPF and V-UPF in VPLMN: In case of PDU Type IPv6, the H-SMF generates an IPv6 Router Advertisement and sends it to the UE via N4 and the H-UPF and V-UPF.

Step 23: This step is the same as step 20 in FIGS. 5A-5B with the difference that this step is executed in the Home PLMN.

NOTE: The SMF in HPLMN can initiate step 21 already after step 13.

UE or Network Requested PDU Session Modification (Non-Roaming and Roaming with Local Breakout)

Figure 7A:
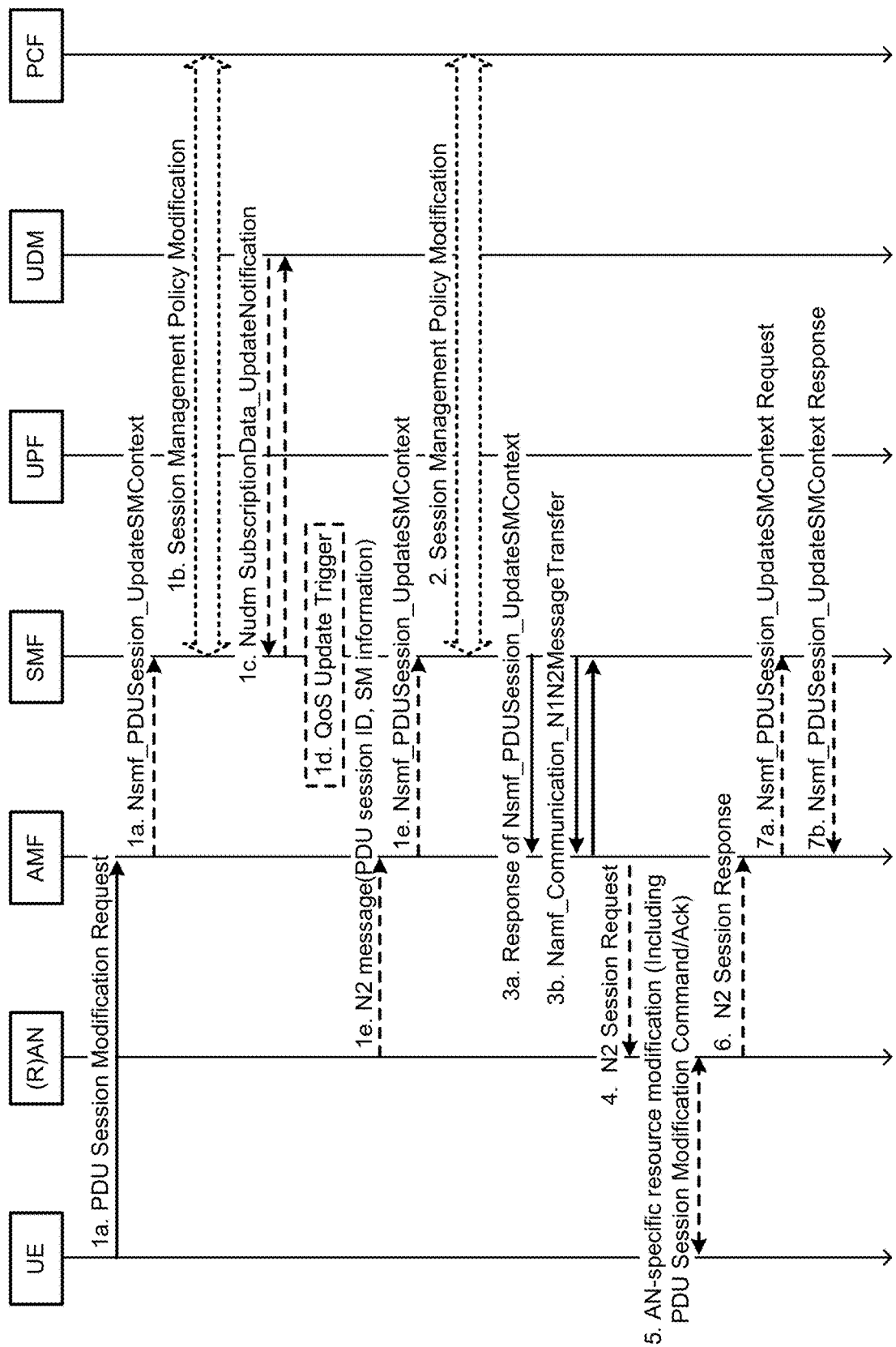
FIGS. 7A and 7B show a message flow diagram illustrating a representative process for UE or network requested PDU Session Modification procedure (non-roaming and roaming with local breakout), which may be used in embodiments of the present invention.
Figure 7B:
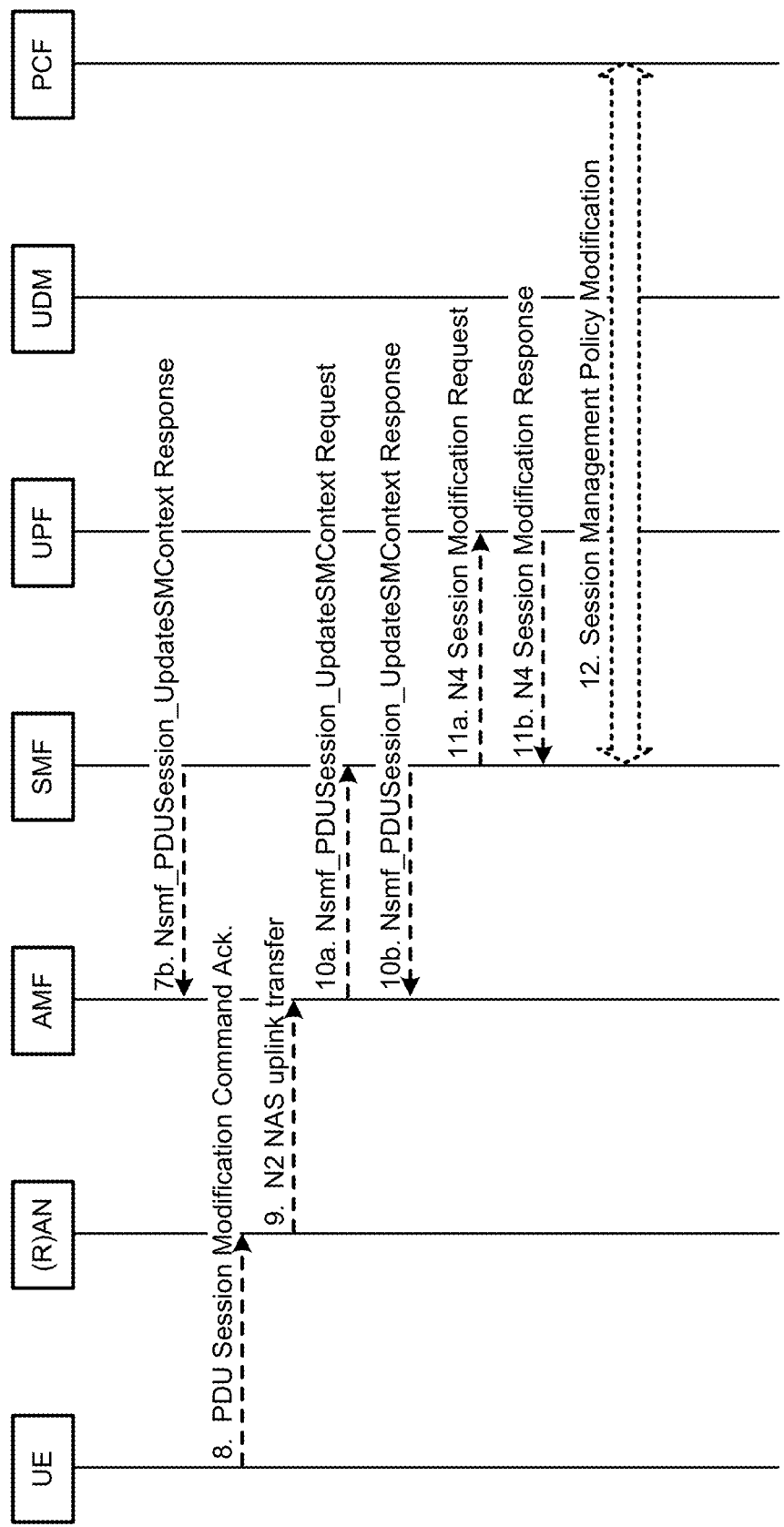

FIGS. 6A and 7B illustrate UE or network requested PDU Session Modification procedure (non-roaming and roaming with local breakout).

Step 1: The procedure may be triggered by following events:

1a: (UE initiated modification) The UE initiates the PDU Session Modification procedure by the transmission of an NAS message (N1 SM container (PDU Session Modification Request(Packet Filters, UE-Specific Application ID, Application-Specific Packet Filter Set Identifiers, Operation, Requested QoS, Segregation)), PDU Session ID) message. Depending on the Access Type, if the UE was in CM-IDLE state, this SM-NAS message is preceded by the Service Request procedure. The NAS message is forwarded by the (R)AN to the AMF with an indication of User location Information. The AMF invokes Nsmf_PDUSession_UpdateSMContext (PDU Session ID, N1 SM container (PDU Session Modification Request)).

When the UE requests specific QoS handling for selected SDF(s), the PDU Session Modification Request includes Packet Filters describing the SDF(s), the requested Operation (add, modify, delete), the Requested QoS and optionally a Segregation indication. The Segregation indication is included when the UE recommends to the network to bind the applicable SDF(s) on a distinct and dedicated QoS Flow e.g. even if an existing QoS Flow can support the requested QoS. The network should abide by the UE request, but is allowed to proceed instead with binding the selected SDF(s) on an existing QoS Flow.

In the PDU Session Modification Request, the UE may provide Application-Specific Packet Filter Set Identifiers, instead of Packet Filters, to indicate the modification will be applied to which Application-Specific Packet Filter Set.

The UE may include UE-Specific Application ID, Application-Specific Packet Filter Set Identifiers instead of Packet Filters.

If the Application-Specific Packet Filter Set Identifiers are unique for the all UE-Specific Applications, the UE-Specific Application ID may be omitted.

NOTE 1: Only one QoS Flow is used for traffic segregation. If UE makes subsequent requests for segregation of additional SDF(s), the additional SDF(s) are multiplexed on the existing QoS Flow that is used for segregation.

The UE may not trigger a PDU Session Modification procedure for a PDU Session corresponding to a LADN when the UE is outside the area of availability of the LADN.

1b: (SMF requested modification) The PCF performs a Session Management Policy Modification procedure as defined in clause 4.16.5 to notify SMF about the modification of policies. This may e.g.; have been triggered by a policy decision or upon AF requests. The PCF may use Application-Specific Packet Filter Set Identifiers, instead of Packet Filters, to indicate the modification will be applied to which Application-Specific Packet Filter Set when sending messages to the UE.

1c: (SMF requested modification) The UDM updates the subscription data of SMF by Nudm_Subscriber-Data_UpdateNotification (SUPI, Subscription Data). The SMF updates the Subscription Data and acknowledges the UDM by returning an Ack with (SUPI). The Subscription Data may include new UE-Specific Application ID(s), and non-standardized Application-Specific Packet Filter Sets and Application-Specific Packet Filter Set Identifiers.

1d: (SMF requested modification) The SMF may decide to modify PDU Session. This procedure also may be triggered based on locally configured policy or triggered from the (R)AN (see clause 4.2.6).

If the SMF receives one of the triggers in step 1b~1d, the SMF starts SMF requested PDU Session Modification procedure.

1e: (AN initiated modification) (R)AN may indicate to the SMF when the AN resources onto which a QoS flow is mapped are released. (R)AN sends the N2 message (PDU Session ID, N2 SM information) to the AMF. The N2 SM information includes the QFI, User location Information and an indication that the QoS Flow is released. The AMF invokes Nsmf_PDUSession_UpdateSMContext (N2 SM information).

(AN initiated notification control) In case notification control is configured for a GBR Flow, (R)AN sends a N2 message (PDU Session ID, N2 SM information) to SMF when the (R)AN decides the QoS targets of the QoS Flow cannot be fulfilled. The N2 SM information includes the QFI indicating that the QoS targets for that QoS flow cannot be fulfilled. The AMF invokes Nsmf_PDUSession_UpdateSMContext (N2 SM information). If the PCF has subscribed to the event, SMF reports this event to the PCF for each PCC Rule for which notification control is set, see step 2. Alternatively, if dynamic PCC does not apply for this DNN, and dependent on locally configured policy, the SMF may start SMF requested PDU Session Modification procedure, see step 3b.

Step 2: The SMF may need to report some subscribed event to the PCF by performing a Session Management Policy Modification procedure as defined in clause 4.16.5. The PCF may provide new policy information to the SMF. This step may be skipped if PDU Session Modification procedure is triggered by step 1b or 1d. If dynamic PCC is not deployed, the SMF may apply local policy to decide whether to change the QoS profile. The PCF may provide SMF new UE-Specific Application ID(s), and non-standardized Application-Specific Packet Filter Sets and Application-Specific Packet Filter Set Identifiers.

Steps 3 to 7 are not invoked when the PDU Session Modification requires only action at an UPF (e.g. gating).

Step 3a: For UE or AN initiated modification, the SMF responds to the AMF through Nsmf_PDUSession_UpdateSMContext (N2 SM information (PDU Session ID, QFI(s), QoS Profile(s), Session-AMBR), N1 SM container (PDU Session Modification Command (PDU Session ID, QoS rule(s), QoS rule operation, Session-AMBR))). See TS 23.501 [2] clause 5.7 for the QoS Profile and QoS rule.

The N2 SM information carries information that the AMF may provide to the (R)AN. It may include the QoS profiles and the corresponding QFIs to notify the (R)AN that one or more QoS flows were added, or modified. It may include only QFI(s) to notify the (R)AN that one or more QoS flows were removed. If the PDU Session Modification was triggered by the (R)AN Release in step 1d the N2 SM information carries an acknowledgement of the (R)AN Release. If the PDU Session Modification was requested by the UE for a PDU Session that has no established User Plane resources, the N2 SM information provided to the (R)AN includes information for establishment of User Plane resources.

The N1 SM container carries the PDU Session Modification Command that the AMF may provide to the UE. It may include the QoS rules and corresponding QoS rule operation to notify the UE that one or more QoS rules were added, removed or modified.

The SMF and may include Application-Specific Packet Filter Set Identifiers, instead of Packet Filters in the N1

SM container, to indicate the modification shall be applied to which Application-Specific Packet Filter Set.

If the Application-Specific Packet Filter Set is not changed, the QoS Rule(s) for one QoS Flow may include UE-Specific Application ID, and Application Specific Packet Filter Set ID, (not the whole Packet Filters), QFI, QoS parameters.

If the Application-Specific Packet Filter Set is modified, the QoS Rule(s) for one QoS Flow may include UE-Specific Application ID, and Application Specific Packet Filter Set, QFI, QoS parameters.

Step 3b: For SMF requested modification, the SMF invokes Namf_Communication_N1N2MessageTransfer (N2 SM information (PDU Session ID, QFI(s), QoS Profile(s), Session-AMBR), N1 SM container (PDU Session Modification Command (PDU Session ID, QoS rule(s), QoS rule operation, Session-AMBR))).

If the UE is in CM-IDLE state and an ATC is activated, the AMF updates and stores the UE context based on the Namf_Communication_N1N2MessageTransfer and steps 4, 5, 6 and 7 are skipped. When the UE is reachable e.g. when the UE enters CM-CONNECTED state, the AMF forwards the N1 message to synchronize the UE context with the UE.

Step 4: The AMF may send N2 PDU Session Request (N2 SM information received from SMF, NAS message (PDU Session ID, N1 SM container (PDU Session Modification Command))) Message to the (R)AN.

Step 5: The (R)AN may issue AN specific signalling exchange with the UE that is related with the information received from SMF. For example, in case of a 3GPP (R)AN, an RRC Connection Reconfiguration may take place with the UE modifying the necessary (R)AN resources related to the PDU Session.

Step 6: The (R)AN may acknowledge N2 PDU Session Request by sending a N2 PDU Session Ack (N2 SM information (List of accepted/rejected QFI(s), AN Tunnel Info, PDU Session ID), User location Information) Message to the AMF. In case of Dual Connectivity, if one or more QFIs were added to the PDU Session, the Master (R)AN node may assign one or more of these QFIs to a (R)AN node which was not involved in the PDU Session earlier; In this case the AN Tunnel Info includes a new N3 tunnel endpoint for QFIs assigned to the new (R)AN node. Correspondingly, if one or more QFIs were removed from the PDU Session, a (R)AN node may not be involved in the PDU Session anymore, and the corresponding tunnel endpoint is removed from the AN Tunnel Info.

Step 7: The AMF forwards the N2 SM information and the User location Information received from the AN to the SMF via Nsmf_PDUSession_UpdateSMContext service operation. The SMF replies with a Nsmf_PDUSession_UpdateSMContext Response.

Step 8: The UE acknowledges the PDU Session Modification Command by sending a NAS message (PDU Session ID, N1 SM container (PDU Session Modification Command Ack)) message.

Step 9: The (R)AN forwards the NAS message to the AMF.

Step 10: The AMF forwards the N1 SM container (PDU Session Modification Command Ack) and User Location Information received from the AN to the SMF via Nsmf_PDUSession_UpdateSMContext service operation. The SMF replies with a Nsmf_PDUSession_UpdateSMContext Response.

Step 11: The SMF may update N4 session of the UPF(s) that are involved by the PDU Session Modification by sending N4 Session Modification Request (N4 Session ID) message to the UPF. For a PDU Session of Ethernet PDU Type, the SMF may notify the UPF to add or remove Ethernet Packet Filter Set(s) and forwarding rule(s). The SMF may provide UPF with new UE-Specific Application ID(s), and non-standardized Application-Specific Packet Filter Sets and Application-Specific Packet Filter Set Identifiers as part of PDR and/or FAR.

NOTE 2: The UPF that are impacted in the PDU Session Modification procedure depends on the modified QoS parameters and on the deployment. For example in case of the session AMBR of a PDU Session with an UL CL changes, only the UL CL is involved.

Step 12: If the SMF interacted with the PCF in step 1b or 2, the SMF notifies the PCF whether the PCC decision could be enforced or not by performing a Session Management Policy Modification procedure as defined in clause 4.16.5.

SMF notifies any entity that has subscribed to User Location Information related with PDU Session change.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method in a Session Management Function (SMF) of a network, the method comprising:
   obtaining, by the SMF during N1 control signal messaging, information including:
      a user equipment (UE) request for an establishment or a modification of a protocol data unit (PDU) session the request including:
         a UE-specific application identifier that uniquely identifies an application among a set of one or more applications supported by the UE; and
         an application-specific packet filter set identifier that uniquely identifies a packet filter set among a group of one or more packet filter sets supported by the application; and
   establishing or modifying the PDU session based on the obtained information.

2. The method of claim 1 wherein one or more of the UE-specific application identifier and the application-specific packet filter set identifier is carried in the request.

3. The method of claim 1 wherein one or more of the UE-specific application identifier and the application-specific packet filter set identifier is pre-defined in the SMF or a user data repository (UDR).

4. The method of claim 1 wherein one or more of the UE-specific application identifier and the application-specific packet filter set identifier is provided by a data network name (DNN) of a data network (DN) that hosts the set of one or more Applications supported by the UE.

5. The method of claim 1, wherein obtaining, by the SMF, comprises obtaining the application-specific packet filter set identifier based on the UE-specific application identifier.

6. The method of claim 5, wherein the application-specific packet filter set identifier is obtained based on a mapping between the application-specific packet filter set identifier and a combination including the UE-specific application identifier.

7. The method of claim 1, wherein establishing or modifying the PDU session comprises identifying the application based on the UE-specific application identifier.

8. The method of claim 1, wherein establishing or modifying the PDU session comprises identifying the packet filter set based on a combination of the UE-specific application identifier and the application-specific packet filter set identifier.

9. The method of claim 1, wherein establishing or modifying the PDU session comprises identifying a quality of service (QoS) flow for the PDU session based on a combination of the UE-specific application identifier and the application-specific packet filter set identifier.

10. The method of claim 1, wherein the PDU session is an unstructured PDU session.

11. A method in a user equipment (UE) of a network, the method comprising:
 requesting an establishment or a modification of a protocol data unit (PDU) session with a session management function (SMF), a N1 control signaling message carrying the request comprising:
  a UE-specific application identifier that uniquely identifies an application among a set of one or more applications implemented on the UE; and
  an application-specific packet filter set identifier that uniquely identifies a packet filter set among a group of one or more packet filter sets supported by the application; and
 establishing or modifying the PDU session in response from the SMF.

12. The method of claim 11 wherein one or more of the UE-specific application identifier and the application-specific packet filter set identifier is pre-defined in one of the SMF and a user data repository (UDR).

13. The method of claim 11 wherein one or more of the UE-specific application identifier and the application-specific packet filter set identifier is provided by a data network name (DNN) of a data network (DN) that hosts the set of one or more Applications supported by the UE.

14. The method of claim 11 wherein the application-specific packet filter set identifier is based on a mapping between the application-specific packet filter set identifier and a combination including the UE-specific application identifier.

15. The method of claim 11 wherein the establishment or modification of the PDU session comprises identifying the application in accordance with the UE-specific application identifier.

16. The method of claim 11 wherein the establishment or modification of the PDU session comprises identifying the packet filter set based on a combination of the UE-specific application identifier and the application-specific packet filter set identifier.

17. The method of claim 11 wherein the establishment or modification of the PDU session comprises identifying a quality of service (QoS) flow for the PDU session based on a combination of the UE-specific application identifier and the application-specific packet filter set identifier.

18. The method of claim 11 wherein the PDU session is an unstructured PDU session.

19. A user equipment (UE) in a network node, the UE comprising:
 a processor; and
 a non-transient memory storing instructions executable in the processor to:
  request an establishment or a modification of a protocol data unit (PDU) session with a session management function (SMF), a N1 control signaling message carrying the request including:
   a UE-specific application identifier that uniquely identifies an application among a set of one or more applications implemented on the UE; and
   an application-specific packet filter set identifier that uniquely identifies a packet filter set among a group of one or more packet filter sets supported by the application; and
  establish or modify the PDU session in response to the SMF.

20. The UE of claim 19 wherein one or more of the UE-specific application identifier and the application-specific packet filter set identifier is pre-defined in one of the SMF and a user data repository (UDR).

* * * * *